United States Patent [19]

Hietala et al.

[11] Patent Number: 5,333,000
[45] Date of Patent: Jul. 26, 1994

[54] COHERENT OPTICAL MONOLITHIC PHASED-ARRAY ANTENNA STEERING SYSTEM

[75] Inventors: Vincent M. Hietala; Stanley H. Kravitz, both of Placitas; Gregory A. Vawter, Albuquerque, all of N. Mex.

[73] Assignee: The United States of America as represented by the United States Department of Energy, Washington, D.C.

[21] Appl. No.: 864,825

[22] Filed: Apr. 3, 1992

[51] Int. Cl.[5] .................. H01Q 3/22; G01B 11/00
[52] U.S. Cl. .................................. 342/368; 356/349
[58] Field of Search ................ 342/368, 371, 372; 359/133, 182, 583, 326, 109, 180, 298, 300, 279; 356/349, 345, 360

[56] References Cited

U.S. PATENT DOCUMENTS

| | | | |
|---|---|---|---|
| 4,739,334 | 4/1988 | Soref | 342/368 |
| 4,884,119 | 11/1989 | Miller | 359/321 |
| 4,965,603 | 10/1990 | Hong et al. | 342/372 |
| 5,022,731 | 6/1991 | Maerfeld et al. | 359/332 |
| 5,117,239 | 5/1992 | Riza | 342/375 |
| 5,124,281 | 6/1992 | Ackerman | 437/209 |
| 5,187,487 | 2/1993 | Riza | 342/372 |

OTHER PUBLICATIONS

Shanmugam, et al., *Digital and Analog Communications Systems*, pp. 269–272 and pp. 280–283, John Wiley & Sons, New York (1979).
Tsai, et al., "Optical Modulation: Acousto-Optical Devices" *Handbook of Microwave and Optical Components*, edited by K. Chang, p. 199, John Wiley & Sons (1991).
Berceli, et al., "A Double-Stage Injection-Locked Oscillator for Optically Fed Phased Array Antennas", *IEEE Trans. on Microwave Theory and Techniques*, vol. 39, No. 2, p. 201 (Feb. 1991).
Koch, et al., "Semiconductor Lasers for Coherent Optical Fiber Communications", *IEEE Journal Lightwave Tech.* vol. 8, No. 3, p. 274 (Mar. 1990).
Vawter, et al., "Monolithically Integrated Transverse-Junction-Stripe Laser with an External Waveguide in GaAs/AlGaAs", *IEEE Journal Quantum Electronics* vol. 25, No. 2, p. 154 (Feb. 1989).
Appleman, et al., "Self-Aligned Chemically Assisted Ion-Beam-Etched GaAs/AlGaAs Turning Mirrors for Photonic Applications", vol. 8, No. 1, p. 39 (Jan. 1990).
Zucker, et al., "Low Voltage Phase Modulation in GaAs/AlGaAs Multiquantum Well Optical Waveguides" *Electron. Lett.*, vol. 24, p. 112 (1988).
Suematsu, et al., "Integrated Twin Guide" *IEEE Journal Quantum Electronics*, vol. 11, p. 457 (1975).
Wu, et al., "Miniature Optical Waveguide Modulator in AlGaAs/GaAs Using Carrier Depletion", *Electronics Letters*, vol. 22, No. 6, p. 328 (Mar. 1986).
Deri, et al., "Rib Profile Effects in Semiconductor Optical Waveguides" *Appl. Phys. Letters*, vol. 53, No. 16, p. 1483 (1988).
Mendoza-Alvarez, et al., "Analysis of Depletion Edge Translation Lightwave Modulators", *IEEE Journal of Lightwave Tech*, vol. 6, No. 6, p. 793 (Jun. 1988).
Izutzu, "Integrated Optical SSB Modulator/Frequency Shifter" *IEEE Journal of Quantum Electronics*, QE-17, No. 11, p. 2225 (Nov. 1981).
Toughlian, et al., "A Deformable Mirror-based Optical (List continued on next page.)

Primary Examiner—Gregory C. Issing
Attorney, Agent, or Firm—Timothy D. Stanley; George H. Libman

[57] ABSTRACT

An optical-based RF beam steering system for phased-array antennas comprising a photonic integrated circuit (PIC). The system is based on optical heterodyning employed to produce microwave phase shifting by a monolithic PIC constructed entirely of passive components. Microwave power and control signal distribution to the antenna is accomplished by optical fiber, permitting physical separation of the PIC and its control functions from the antenna. The system reduces size, weight, complexity, and cost of phased-array antenna systems.

39 Claims, 27 Drawing Sheets

OTHER PUBLICATIONS

Beamforming System for Phased Array Antennas", *IEEE Photonics Technology Letters*, vol. 2, No. 6, p. 444 (Jun. 1990).

Nickerson, et al., "Optical Processor for Array Antenna Beam Shaping and Steering" *Optical Engineering*, vol. 30, No. 10, p. 1497, (Oct. 1991).

Walker, "Simple and Accurate Loss Measurement Technique for Semiconductor Optical Waveguide" *Electronics Letters*, vol. 21, No. 13, p. 581 (Jun. 1985).

Soref, "Voltage-Controlled Optical/RF Phase Shifter," pp. 992-998, Journal of Lightwave Technology, vol. LT-3, No. 5, Oct. 1985.

Matsumoto, et al., "Microwave Phase Shifter Using Optical Waveguide Structure," pp 1-24, Dept. of Electrical Engineering Faculty of Engineering Science, Osaka University, Japan.

Vawter, "Integrated Optoelectronics for Communications and Processing", edited by C. S. Hong, pp. 178-184, SPIE, vol. 1582 (Sep. 1991).

Hietala, et al., "Phased-array Antenna Control by a Monolithic Photonic Integrated Circuit," edited by Shi-Kay Yao, pp. 170-175, SPIE vol. 1476 (Apr. 1991).

COHERENT OPTICAL MONOLITHIC PHASED-ARRAY ANTENNA STEERING SYSTEM

GOVERNMENT RIGHTS

The U.S. Government has a paid-up license in this invention and the right in limited circumstances to require the patent owner to license others on reasonable terms.

CROSS-REFERENCE TO RELATED APPLICATION

A related application entitled "Digitally Controlled Distributed Phase Shifter" U.S. patent application, Ser. No. 07/854,024, to Hietala, et al., filed Mar. 19, 1992, and the specification thereof is incorporated herein by reference.

BACKGROUND OF THE INVENTION

Field of the Invention (Technical Field)

The present invention relates to steering of phased-array antenna systems and to construction of optical circuitry.

Background Art

Phased array antennas exhibit desirable properties for communication and radar systems. One primary feature of these antennas is that they require no mechanical motion for beam steering. This allows for very rapid beam steering and excellent reliability. Another primary feature is the ability to bring high power to the target while minimizing typical microwave power combining losses. Unfortunately, phased array antennas are also very complex electronic systems. They require relatively complex and heavy transmit and receive electronics at the antenna location and/or significant microwave distribution systems. Large arrays and millimeter wave frequencies contribute to these disadvantages. These issues have effectively limited the use of phased-array antennas.

Phased-array antennas offer at least three principal benefits over conventional mechanically steered antennas:

1. Electronically controlled phased-array antennas are "inertia-less." They can be "instantaneously" pointed in any direction. No mechanical movement is required, which also means no mechanical wear will occur.

2. The antenna can radiate and receive in multiple directions simultaneously.

3. Phased-array antennas can be built with MMIC chips at each antenna element (forming the so-called "active array" antenna) allowing for very large effective-radiated power levels and large system redundancy.

Electronically-controlled phased-array antennas are not only useful for radar systems. They are useful for any application requiring a steerable antenna (e.g., communication systems).

Phased-array antennas produced today are extremely expensive. One of the reasons for their large expense is the great complexity of electrical interconnects for radio frequency (RF) signal distribution and phase control. The present invention addresses this deficiency by replacing virtually all of the interconnects with a single photonic integrated circuit and inexpensive fiber-optic cables.

Control of arbitrarily large phased-array antennas from a lightweight, compact unit represents a significant challenge in the implementation of phased-array radar for airborne systems. Current systems use large amounts of bulky copper cable with RF splitters and phase shifters to distribute RF power to the antenna and control the phase of each element. This approach often results in desk-sized control units weighing many hundreds of pounds. Electronically steerable phased-array antennas are being used today almost exclusively in military systems. This is largely true due to their great expense.

The present invention recasts the same system configuration in lightweight optical fiber with optical phase-shift elements and interconnecting optical circuitry made from GaAs/AlGaAs or lithium niobate waveguides. This approach will result in a significantly lighter and less costly system. The present invention provides an optical system which greatly reduces the phase control electronics and electrical interconnect complexity normally associated with a phased-array antenna. The invention permits reduction of the system cost of such antenna, and thus allows for many commercial applications to become economically feasible.

Photonic integrated circuits (PICs) have not evolved to the level of sophistication of electronic integrated circuits. One primary impediment to the development of a wide variety of PICs for many applications is the difficult design and fabrication process required of every new PIC. Development of a fully functional PIC requires careful consideration of the application requirements, the detailed behavior of each device used, and the interaction of all the devices with the others. Generally, custom processing is required in order to build the circuit, requiring the engineer designing the circuit to have a full understanding of the process capabilities and limitations. This is in sharp contrast to the electronic integrated circuit field in which well established device and circuit design rules based on proven process technology allow engineers to easily lay out integrated circuits. The engineer requires only a minimum understanding of the actual operation of the devices in the circuit and the process technology required to manufacture the circuit. This ease of design and the ability of the designer to view the manufacturing process as a black box from which useful components emerge (provided adherence to the design rules) has allowed a wide diversity of electronic integrated circuits to flourish in the marketplace.

In order for PICs to become widely accepted as viable solutions in a variety of applications, the huge overhead cost associated with custom design and manufacture of each circuit must be minimized. One way to minimize costs is to follow the example of the electronic integrated circuit industry by establishing a fixed set of mutually compatible devices with well-established design rules governing their placement in the circuit in such a manner as to assure an operating PIC. The present invention includes one such optical device set and covers several application circuits which may be realized with the device set.

SUMMARY OF THE INVENTION (DISCLOSURE OF THE INVENTION)

The present invention relates to a coherent optical monolithic phased-array antenna steering system and method. The apparatus and method comprise generating a reference and frequency-shifted lightwave signal; dividing the reference and frequency-shifted lightwave signals into a plurality of phase-shifted pairs of lightwave signals; heterodyning each pair of the plurality of phase-shifted pairs of lightwave signals, and thereby generating a plurality of RF signals; and transmitting the plurality of RF signals.

A continuous-wave laser, a pair of Mach-Zehnder modulators, several pairs of Mach-Zehnder modulators connected in push-pull configuration, and the like, may be used to generate the pair of frequency-shifted lightwave signals. A microwave power splitter should also be used in accordance with the invention.

A plurality of signal dividers, optical phase-shifting devices (e.g. controlled by a plurality of voltage inputs), and the like, may be used to divide the reference and frequency-shifted lightwave signals into a plurality of phase-shifted pairs of lightwave signals.

A plurality of transmit/receive modules may be used to heterodyne each phase-shifted pair of lightwave signals and generate a plurality of RF signals. The transmit/receive modules may comprise photodetectors, amplifiers, transmitters, receivers, and the like.

A photonic integrated circuit may be used to generate the frequency-shifted lightwave signal and to divide the reference and frequency-shifted lightwave signals into a plurality of phase-shifted pairs of lightwave signals.

The invention further relates to a photonic circuit apparatus and method comprising an optical frequency translator for generating a frequency-shifted lightwave from a reference lightwave, an optical phase controller for generating a plurality of phase-shifted pairs of lightwaves from the reference and frequency-shifted lightwaves, and the like. The apparatus and method may further comprise use of continuous-wave laser inputs and microwave frequency reference inputs.

The optical frequency translator may further comprise a plurality of optical phase shifters, a plurality of phase modulators, and the like. The phase modulators may comprise a plurality of Mach-Zehnder interferometers, at least two pairs of Mach-Zehnder interferometers connected in push-pull configuration, and the like. The optical phase controller may further comprise analog or digital phase controls.

The invention further relates to a method of making a ridge type waveguide double heterostructure integrated circuit apparatus comprising the steps of:

a) masking a p-n wafer with a dry-etch mask of hard-baked photoresist;

b) patterning a layer of resist with couplers, turning mirrors, gratings, branches, and phase modulators by optical or electron beam lithography;

c) providing the top of the wafer with the patterned layer of resist;

d) etching the resist layer into the hard-baked photoresist mask;

e) etching the hard-baked photoresist pattern into the wafer;

f) coating the wafer with dielectric; and g) depositing ohmic metal contacts on the wafer.

Optical interferometry may be utilized to determine etch rate and depth. The method may further comprise etching the turning mirrors on the wafer and etching with chlorine reactive ion beams and oxygen reactive ion beams. This type of etching may also be utilized to define a rib waveguide.

Waveguides, amplitude modulators, phase modulators, and the like can be made in accordance with the method set forth above.

The invention further relates to a photonic integrated circuit comprising a plurality of waveguides, a plurality of turning mirrors, at least one optical power splitter, and at least one phase modulator, wherein the waveguides operably connect the turning mirrors, the optical power splitter, and the phase modulator. This circuit may further comprise input and/or output couplers operably connected to one of the waveguides, optical power combiners, and the like.

A primary object of the present invention is to provide a phased-array antenna steering system comprising a photonic integrated circuit and fiber optic cables.

An additional object of the invention is to provide a photonic integrated circuit having as inputs a coherent laser beam and a reference radio frequency or millimeter wave power supply, and having as outputs a plurality of beams having the same frequency as the laser beam and that of the laser beam plus or minus the frequency of the reference power supply.

Another object of the invention is to provide a process set of devices useful for construction of photonic integrated circuits.

Yet another object of the invention is to provide a tunable filter to select particular frequencies of light.

Still another object of the invention is to provide a method of reliably fabricating photonic integrated circuits.

A primary advantage of the invention is that the steering system and photonic integrated circuit have a small size and low power requirements, and use inexpensive fiber optic cabling.

Another advantage of the invention is that the steering system is remotely locatable from the antenna transmit/receive elements (up to approximately one kilometer).

Yet another advantage of the invention is that the steering system provides for digital control of phase shifting.

Still another advantage of the invention is that the steering system and the photonic integrated circuit are radiation-hardened.

Yet another advantage of the present invention is that the steering system makes possible extremely rapid directional changes in antenna output and reception.

Other objects, advantages, and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

Figure 1:
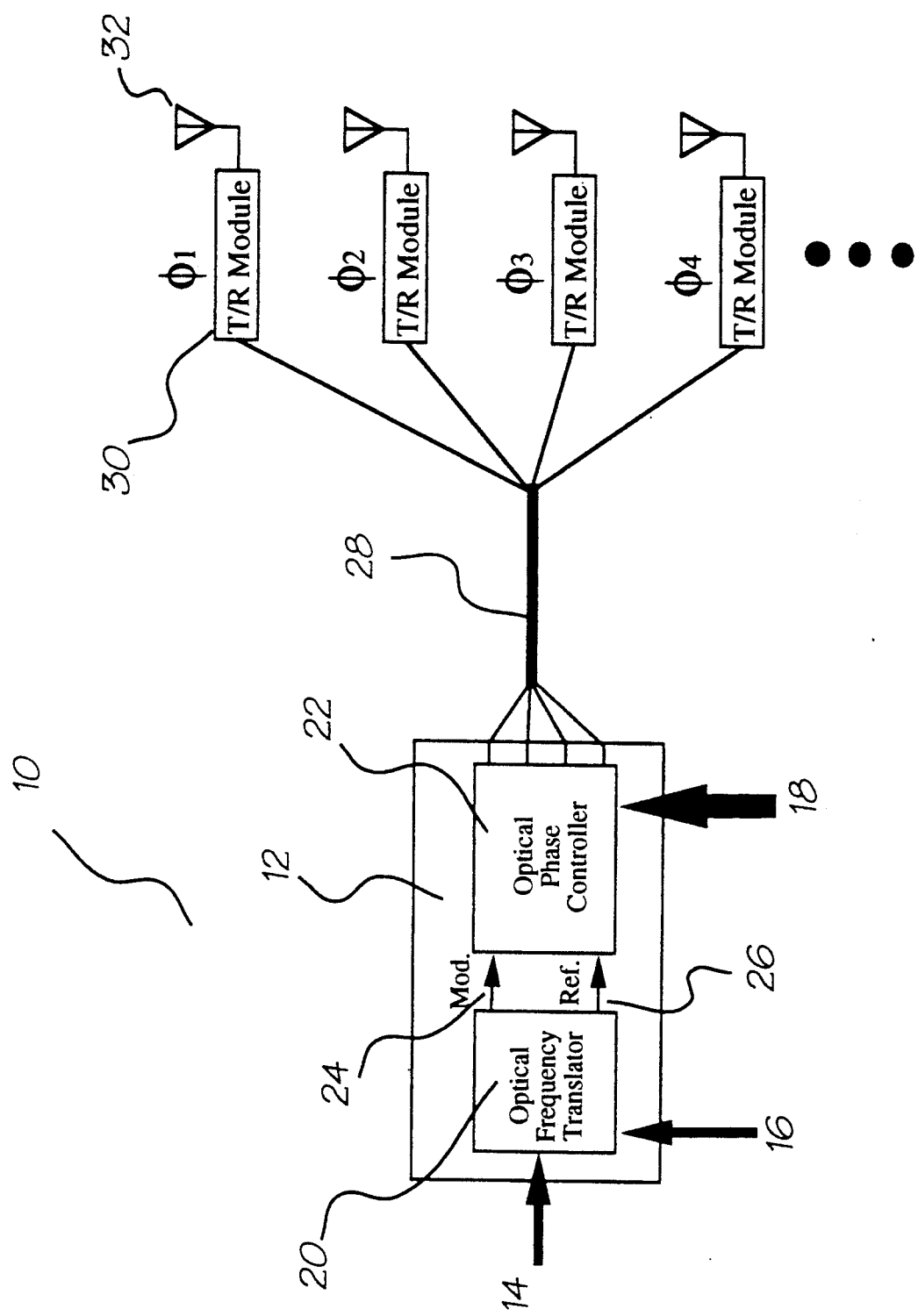
FIG. 1 is a schematic diagram of the preferred coherent optical monolithic phased-array antenna steering system of the invention.

DESCRIPTION OF THE PREFERRED EMBODIMENTS (BEST MODES FOR CARRYING OUT THE INVENTION)

The present invention is of a coherent optical system for steering phased-array antenna. The system is based on optical heterodyning to produce the required RF signals with the appropriate phase shift and is based on a Photonic Integrated Circuit (PIC) which is comprised entirely of passive optical components. A single-mode narrow-linewidth laser provides the optical power to the system.

The present invention is also of an all optical circuit in GaAs/AlGaAs for control of phased-array systems using a single photonic integrated circuit chip, which has the potential for high-performance control of phased-array systems from a small, lightweight, package. The circuit is based exclusively on combinations of reverse-biased optical phase modulators, waveguide interconnects, corner reflectors, and power splitter combiners with optical-fiber output to the antenna elements.

Optical Heterodyning

The steering system of the present invention is based on optical heterodyning (i.e., beating or mixing). In the steering system, radio-frequency (RF) or millimeter wave signals are produced by the heterodyning together of two lightwaves. (Since wavelength and frequency are inversely related, the term "RF" employed herein is considered equivalent to "millimeter wave.") These two lightwaves must differ in frequency by the desired RF output frequency. These two signals are routed to a photodetector which exhibits a standard square-law response. The two lightwaves therefore heterodyne at the photodetector, producing the desired RF output. The useful phenomenon associated with this beating is that any optical phase shift introduced to one of the lightwaves will appear as an equal phase shift in the RF output. (R. A. Soref, "Voltage-Controlled Optical/RF Phase Shifter," *Journal of Lightwave Technology* LT-3:5, page 992, October 1985).

Analytically, the electric field of the two lightwaves can be described as:

$$E_1 = A_1 \sin(\omega_c t - k_1 z) \tag{1}$$

and $$E_2 = A_2 \sin((\omega_c + \omega_{rf})t - k_2 z + \Delta\phi) \tag{2}$$

where both fields are assumed to be identically polarized, $E_2$ is assumed to have an adjustable phase shift $\Delta\phi$, $\omega_c$ and $\omega_{rf}$ are the optical and RF angular frequencies, respectively, and propagation is assumed in the z direction.

The optical electric field to circuit current transfer function of a photodetector can be written:

$$I(t) = \xi E_{inc}(t)^2 * h_{lp}(t) \tag{3}$$

where $\xi$ includes such constants as the detector's responsivity, the operator * means convolution, and $h_{lp}$ is the impulse response of the detector. Assuming the bandwidth of the photodetector is much less than the optical frequencies, the $*h_{lp}(t)$ operation is equivalent to simply dropping all terms with frequencies much greater than $\omega_{rf}$.

Eqs. (1), (2), and (3) can now be combined to describe the actual heterodyning process at the detector. The incident field ($E_{inc}$) on the detector is the sum of the two lightwaves (Eqs. 1 and 2) with phase shifts corresponding to the propagation distance $z_0$. After substitution and simplification, the current produced at the detector is:

$$I(t) = \frac{\xi}{4} (A_1^2 + A_2^2 + A_1 A_2 \cos(\omega_{rf} t - (k_2 - k_1)z_0 + \Delta\phi)) \quad (4)$$

where $k_1$ and $k_2$ are the propagation constants of the $E_1$ and $E_2$ lightwaves traveling down the optical channel to the photodetector, respectively. The phase shift introduced by the propagation to the detector can be easily simplified, yielding:

$$(k_2 - k_1)z_0 = \quad (5)$$

$$\left( \frac{(\omega_0 + \omega_{rf}) n_0}{c} - \frac{\omega_0 n_0}{c} \right) z_0 = \frac{\omega_{rf} n_0}{c} z_0 = \frac{2\pi}{\lambda_{rf}} z_0$$

where $\lambda_{rf}$ is the effective RF wavelength in the optical channel to the detector. Substituting Eq. (5) into Eq. (4) gives:

$$I(t) = \frac{\xi}{4} \left( A_1^2 + A_2^2 + A_1 A_2 \cos\left( \omega_{rf} t - \frac{2\pi}{\lambda_{rf}} z_0 + \Delta\phi \right) \right). \quad (6)$$

Eq. (6) exhibits three important properties for the use of optical heterodyning in RF phase control:

(1) The optical phase shift $\Delta\phi$ introduced on one of the optical waves ($E_2$) translates directly into an equivalent RF phase shift $\Delta\phi$ at the detector.

(2) The resulting RF signal is independent of the optical wavelength. Only a difference in frequency between two optical beams must be maintained.

(3) The optical channel length sensitivity depends on a microwave wavelength, not on optical wavelength.

The translation of an optical phase shift into an RF phase shift, as seen in Eq. (6), is fundamental to the steering system of the invention. Notice that this phase shift is independent of $\omega_{rf}$. Therefore, a system based on this effect will produce the same phase shift independent of the operating frequency. Thus the system is inherently broadband—limited only by the technique used to produce the optical heterodyning frequency offset. This does not imply instantaneous broadband operation. Beam "squint," where different spectral components will be directed in slightly different directions, will occur.

Beam "squint" is certainly an issue for antenna systems which operate over a broad frequency range, such as broadband communication systems. But for radar systems, which typically operate with a small instantaneous bandwidth, this should not be a significant issue. Note that the steering system's bandwidth is very large; essentially DC to the optical modulator's bandwidth but the instantaneous bandwidth will be determined by the acceptable beam squint for individual systems.

The lack of optical phase dependence on the channel length ($z_0$) to the antenna element is an important feature of the technique. Since both lightwaves travel in the same optical channel to the antenna element, they both will experience very similar phase shifts. The actual phase introduced by the channel length is the equivalent RF propagation constant in the fiber ($2\pi/\lambda_{rf}$ as found above). Therefore, even though the steering system is an optical system, fiber optic interconnect lengths are only as sensitive as normal electrical interconnects.

System Overview

A block diagram of the steering system 10 is shown in FIG. 1. The system is based on a custom Photonic Integrated Circuit (PIC) 12 which produces the two lightwaves 24 (modulated) and 26 (reference) required for phase control of each antenna element 32. The entire system is driven by one continuous-wave (CW) laser 14. An optical fiber 28 is connected from the PIC 12 to each Transmit/Receive (T/R) module 30 which interfaces to an actual antenna element 32. Since optical fibers exhibit low loss and excellent immunity to Electromagnetic Interference (EMI), the optical fibers 28 may be selected to place the PIC 12 of the steering system 10 at large distances (over approximately one kilometer) from the actual antenna elements 32. The operating frequency of the system is determined by the microwave source 16 which drives the PIC 12. The relative phase of each antenna element 32 is controlled by the voltage(s) applied by analog or digital phase control 18 to the optical phase shifters 22 in the PIC 12.

Because the steering system 10 is not sensitive to frequency drift or the precise phase of the coherent laser input 14, a plurality of sets of lasers 14 and PICs 12 may be used with any given antenna, with reference power supplied to each PIC 12 by the same microwave power source 16. That is, an antenna with a large number of elements 32 may have subsets of the elements controlled by separate laser/PIC pairs.

The steering system 10 of the present invention can be conveniently divided into two primary components: the PIC 12 and the T/R modules 30 located near the antenna elements 32. The PIC 12 produces the appropriate lightwave signals from the incident laser light 14 and the applied electrical signals 16 and 18. In the T/R modules 30 these lightwave signals are converted back into phase-controlled microwave signals. The PIC 12 can further be divided into two sub-components termed for convenience the Optical Frequency Translator (OFT) 20 and the Optical Phase Controller 22. The OFT 20 serves only the function of producing the two lightwave signals and 26 required for the heterodyning process. The Optical Phase Controller 22 is comprised of the power dividers required to produce an output for each antenna element 32 and the optical phase shifters required for phase control.

Optical Frequency Translator

Figure 2:
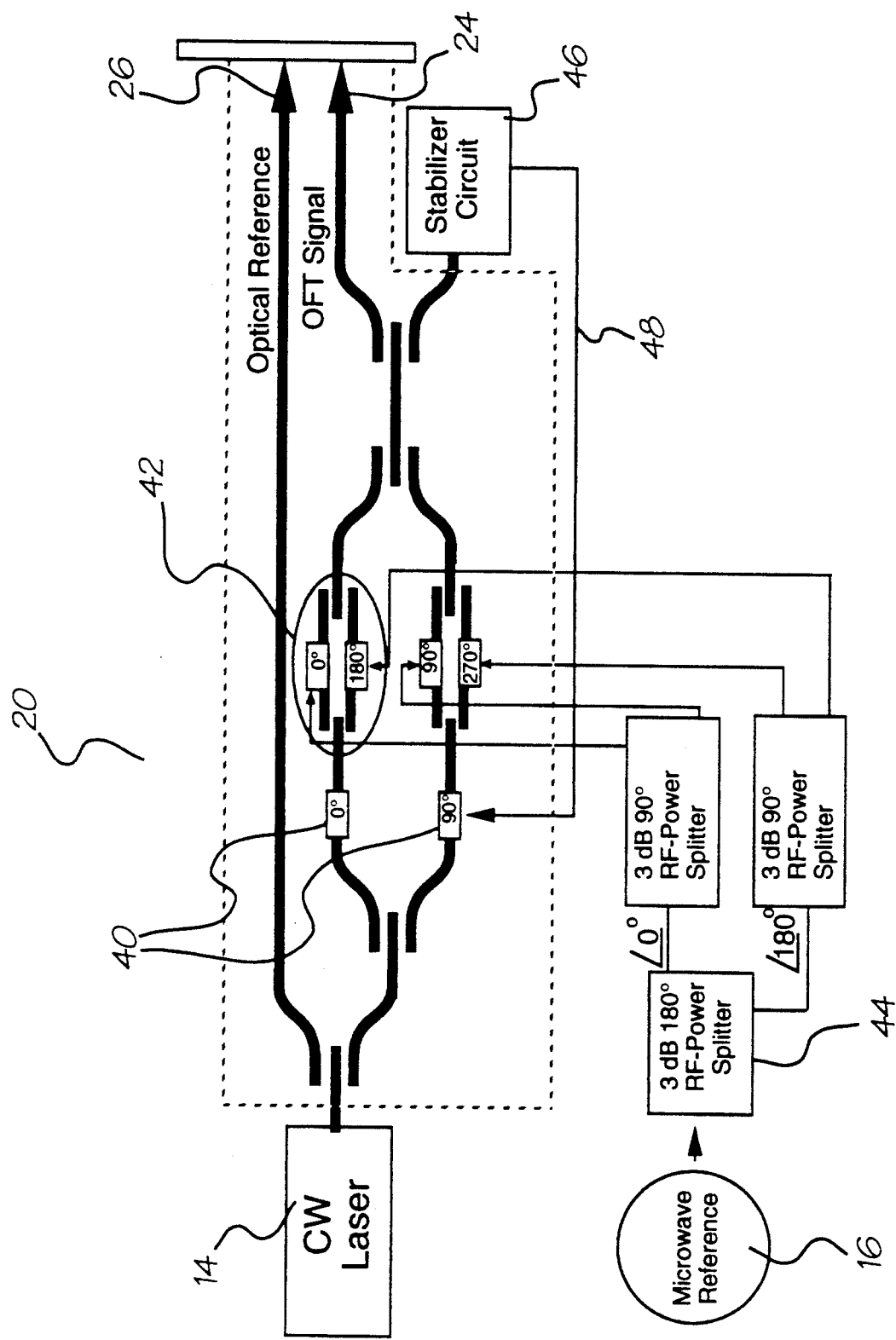
FIG. 2 is a schematic diagram of the preferred Optical Frequency Translator of the invention.

FIG. 2 shows a detailed diagram of the OFT 20. Its function is to produce the two lightwave signals 24 and 26 required for heterodyning. A single CW laser 14 is coupled into the PIC to power the system. The signal is then split into two parts 24 and 26 of which one part 26 is directly passed on, whereas the other part 24 is modulated (frequency shifted by the RF operating frequency). The output signal termed Optical Reference Signal 26 is simply a portion of the light from the CW laser 14. The other output signal termed Optical Modulated Signal 24 is a frequency shifted portion of the light from the CW laser 14. The frequency shift is identical to the frequency of the microwave source 16 driving the system.

The OFT 20 shown in FIG. 2 is an analog to a traditional RF Single-Sideband (SSB) modulator. (K. S. Shanmugam, *Digital and Analog Communications Systems*, pp. 269-272, John Wiley & Sons, New York (1979).) The modulators 42 (Mach-Zehnder type) in FIG. 2 are assumed to produce a perfect multiplication of the microwave reference signal 16 provided by the 90° microwave power splitter 44 and the incident light provided by optical phase shifters 40. The output from each modulator 42 will be perfect double-sideband (DSB) optical signals. Then, due to careful phase selection (optical and RF), the undesired sideband can be canceled out. This will leave only the desired sideband or, equivalently, a replica of the incident lightwave shifted in frequency by the RF operating frequency. Second harmonic detector 46 provides feedback 48 for phase stabilization.

The frequency translated lightwave 24 may, of course, be produced by other means such as with acousto-optical modulators. (C. S. Tsai, "Optical Modulation: Acousto-Optical Devices," *Handbook of Microwave and Optical Components*, edited by K. Chang, page 199, John Wiley & Sons, 1991.) Whatever technique is used, it is critical that the resulting lightwaves remain in "phase-noise" synchronism. If synchronism is not maintained, the laser phase noise will map into the RF output. This limits the possibility of using two separate lasers for the lightwaves unless they are intimately locked together.

Optical Phase Controller

Figure 3:
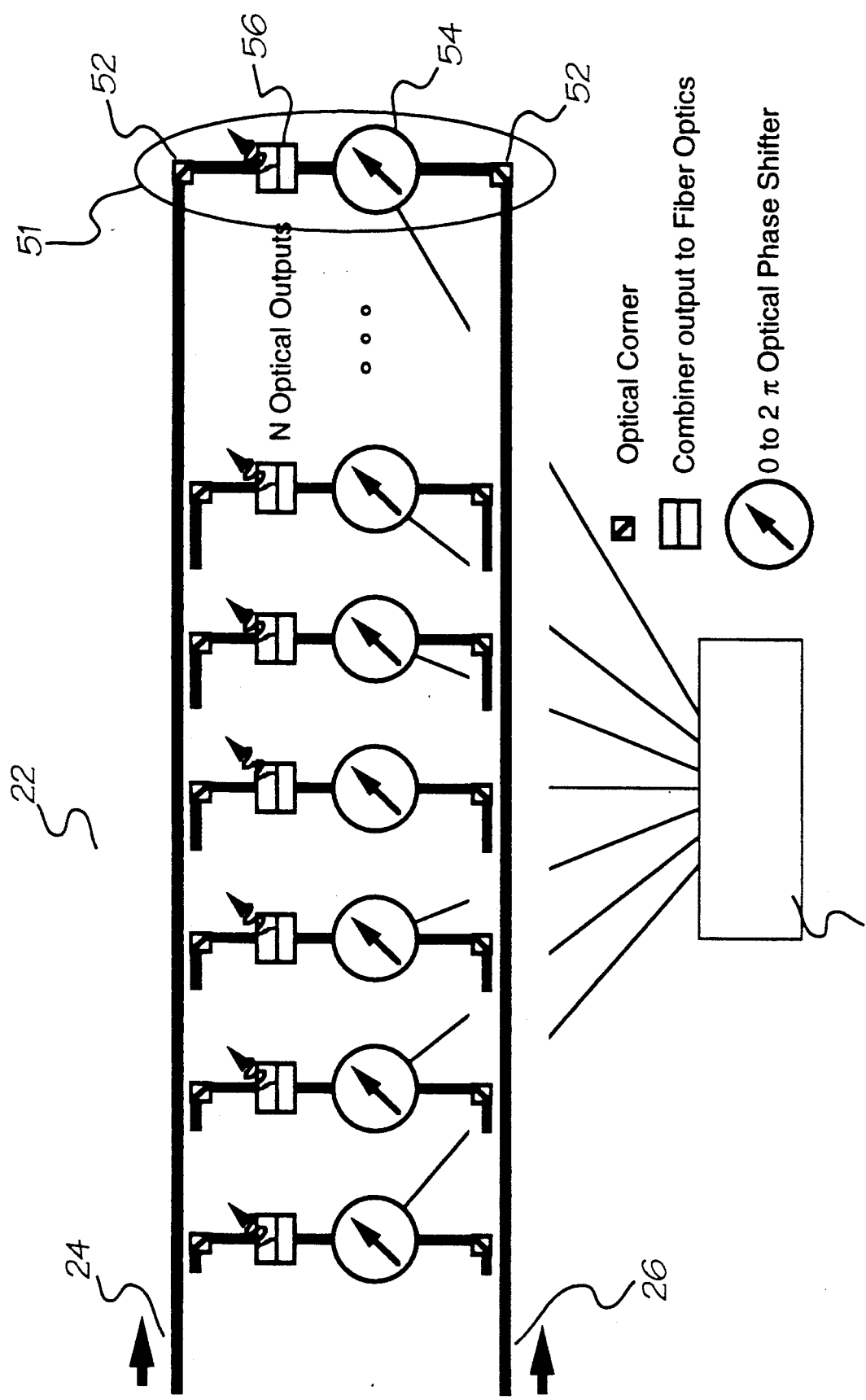
FIG. 3 is a schematic diagram of the preferred Optical Phase Controller of the invention.

The other portion of the PIC 12 is the Optical Phase Controller 22. As shown in FIG. 3, the Optical Phase Controller 22 takes the two lightwave signals 24 and 26 produced by the Optical Frequency Translator 20 and divides each of the signals into N parts which are then routed via optical fiber to the T/R modules 30. Transmission of the N parts is accomplished by analog or digital control 18 of N antenna element phase shift and dual-beam output couplers 51, each comprising two optical corners 52, 0 to $2\pi$ radians optical phase shifter 54, and combiner output element 56. A unique optical phase shift is introduced to the reference lightwave being sent to each T/R module 30. This phase shift is, of course, intended to map directly into the RF phase shift at the T/R module 30. It is understood that the optical phase shift could be introduced into either lightwave signals 24 or 26.

Transmit/Receive Module

Figure 4:
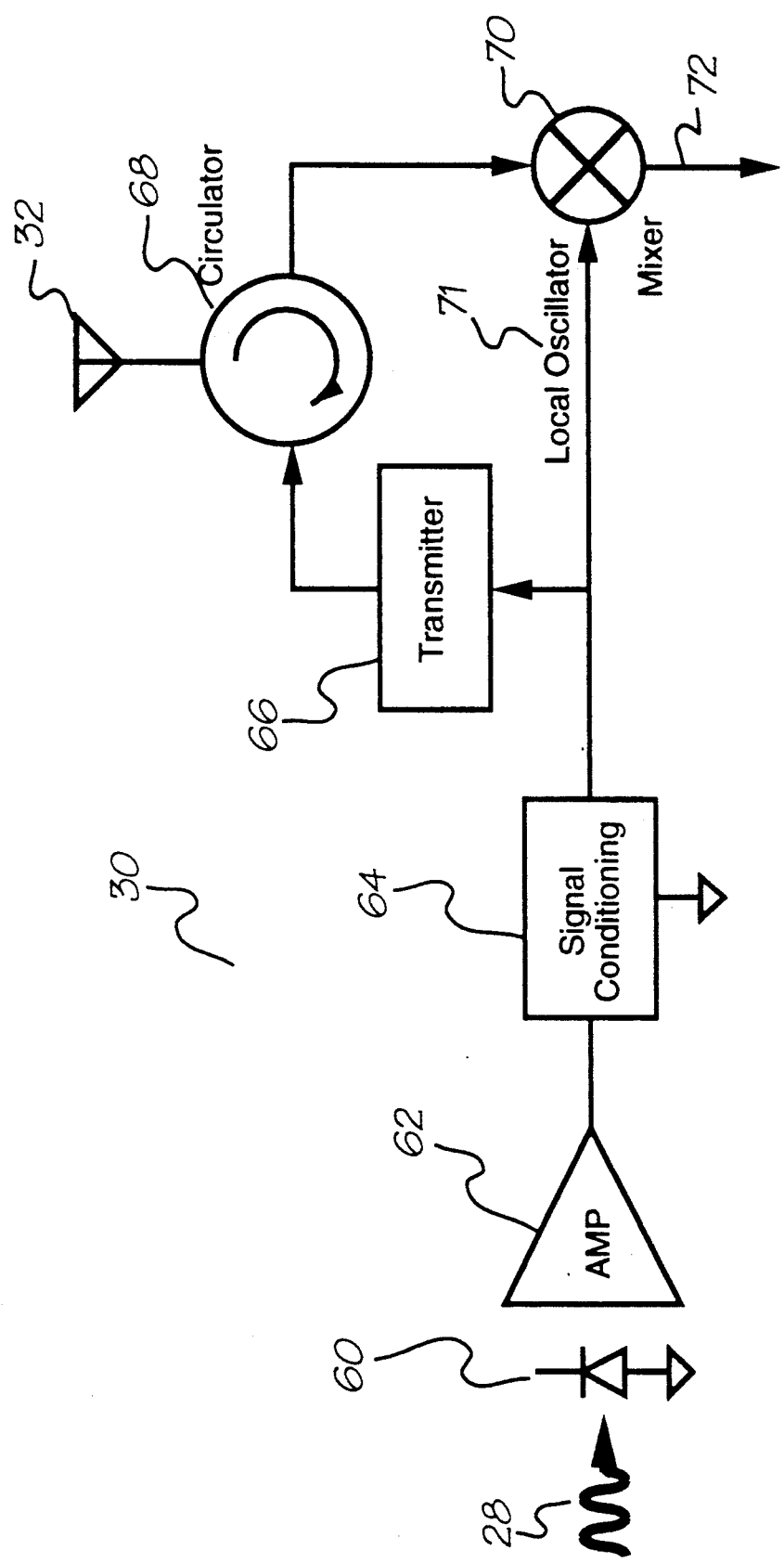
FIG. 4 is a schematic diagram of the preferred Transmit/Receive Module of the invention.

The PIC 12 of the present invention produces and launches into an optical fiber 28 the two lightwave signals 24 and 26 required for the heterodyning process. At each antenna element 32, a Transmit/Receive (T/R) module 30 is required to recover the RF signal. The actual electronics in the T/R module 30 will be application specific. FIG. 4 shows a generic configuration of a T/R module 30. The optical signals are heterodyned in the square-law photodetector 60. The resulting signal may require amplification 62 and further signal conditioning 64. The signal conditioning 64 may be such operations as simple as filtering or as complicated as frequency multiplication. Note that injection-locked RF oscillators are well suited for the RF signal recovery. (T. Berceli, et al., "A Double-Stage Injection-Locked Oscillator for Optically Fed Phased Array Antennas," *IEEE Trans. on Microwave Theory and Techniques* 39:2, page 201, Feb. 1991.)

The recovered signal may then be routed to high power amplifiers (transmitter 66 in FIG. 4) for transmission via circulator 68 or used for a phase referenced local oscillator 71 for receive. In the configuration of FIG. 4, if transmission and reception is desired at the same frequency, the microwave reference 16 driving the PIC 12 will require a frequency shift to the IF frequency during receive. Reception is provided by circulator 68, mixer 70, and IF output to adder 72. Again, it is important to note that the exact use of the recovered signal will be largely application specific.

Amplitude Modulation Enhancement

The invention, as described above, primarily addresses the issue of phase control of an RF signal at the individual antenna elements. In a general phased array antenna, amplitude control of the RF signal presented to each antenna element is also commonly desirable. This will allow for improved antenna side-lobe rejection. To address this need, two phase controlled channels as described above can be added electronically at the transmit/receive modules 30 to produce one amplitude and phase controlled signal. Amplitude and phase would then be controlled by varying the phase of the two channels. If the channels approach 180° phase difference, the combined output will be low in amplitude with the phase determined by the common phase term of the two channels. In the other extreme, if both channels are in phase, the output amplitude will be quite large with, again, the phase controlled by the common phase on the two channels. Clearly, arbitrary phase and amplitude control of an RF signal at a T/R element is possible by the summation of two phase controlled channels. The price off this approach is, of course, the doubling of complexity in the optical system.

System Overview Conclusion

Figure 5:
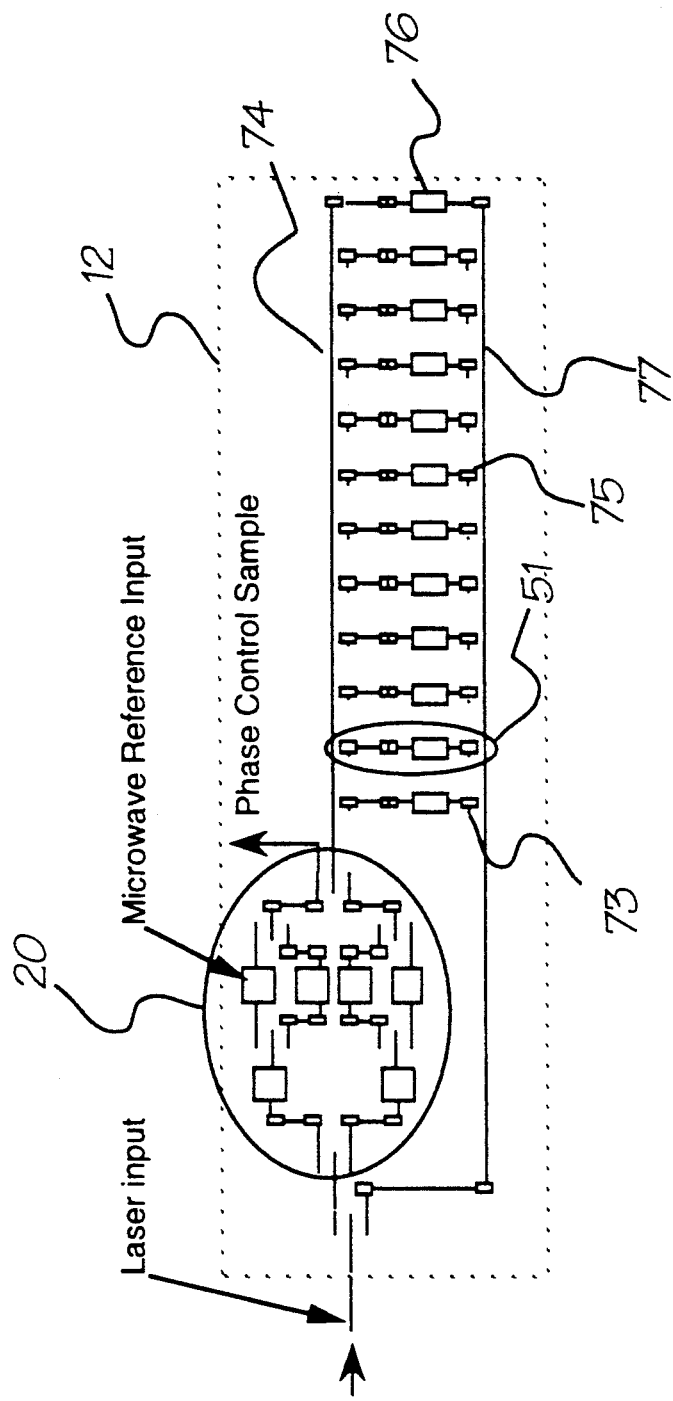
FIG. 5 is a schematic diagram of the preferred PIC of the invention.

The steering system of the present invention provides a large size and weight reduction, as well as a reduction in interconnect complexity and phase-control electronics for phased-array antennas. As illustrated in FIG. 5, the PIC 12, comprising the Optical Frequency Translator 20 and an array of antenna element phase shift and dual-beam output couplers 51, can be constructed entirely of passive optical components (save phase modulators, which may be considered active) fabricated in a simple GaAs/AlGaAs material system: waveguides 77, splitter/combiners 73, turning mirrors 74, output couplers 75, and phase modulators 76. The PIC 12 and control elements can be separated from the antenna via fiber optic cable. This approach enables phase-array systems to be fielded which previously have been impossible due to size, weight, and complexity constraints.

PIC Circuit Components

Photonic integrated circuits are typically designed from the top down. An application is first selected. An optical circuit is then designed to achieve the desired result. Finally, a method is found to fabricate the required circuit. This design method, when successful (T. L. Koch and U. Koren, "Semiconductor Lasers for Coherent Optical Fiber Communications," *IEEE J. Lightwave Tech.* 8:3, page 274, March 1990), generally results in a very high-performance but costly circuit.

A more practical approach, one which will result in a greater diversity of circuit applications from a given PIC technology, is to reverse the order of design and first select those process technologies which are expected to be controllable, reproducible, and high yield. Then the set of optical devices which can be fabricated using only the selected desirable process technologies is determined. Finally, functional application circuits are defined which can be assembled out of the allowed set of devices. The concept is to select a minimum number of processes best suited for PIC fabrication and then decide what kinds of devices can be made with only those few processes in such a manner that all the devices may be interconnected into a functional PIC using a set of reasonably simple design rules. If this selection process is done correctly, the result should be a manufacturable PIC technology. It should be noted, however, that in the corporate environment the application (or general class of application) is often specified first and may dictate that certain types of devices, such as lasers or detectors, be included in the device set. This fact will necessarily influence the set of allowed processes. In the steering system PIC application of the present invention, a need was identified for a generic collection of circuits suitable for coherent optical processing. Complete integration of light source, optical circuit, and detector was not a requirement. These facts allow a very simple technology based on phase modulation, without optical sources and detectors.

Process Technologies Suitable for PICs

An evaluation for coherent-optical signal processing applications is summarized below. Two unavoidable technologies are metalization for electrical contact and etching for definition of waveguides, gratings, and mirrors. Metal is applied by evaporation and lift-off or selective-area plating. Etching of metal is not desirable due to undercut problems and the possibility of the metal etchants attacking the III-V compound semiconductor. Wet chemical etching of the semiconductor will not be used since it does not offer much control of wall angle. Dry plasma etching processes which allow smooth vertical walls or walls of arbitrary angle for waveguides, reflective facets, and gratings are preferred. Chlorine reactive-ion-beam etching (RIBE) is an ideal technique for etching of waveguides and facets due to its smooth morphology, extreme anisotropy, and variable angle of incidence. Conventional reactive-ion-etching (RIE) would also be useful but does not offer easily variable wall angle. Ion milling offers adjustable wall angles but cannot simultaneously etch two walls, facing opposite directions, at the same angle. Chemically assisted ion-beam etching (CAIBE) is nearly as good as RIBE except for shadowing effects of the injected reactive gas and greater process complexity. Lithography methods will include all standard contact and projection exposures as well as electron-beam direct write. Electron-beam exposure is required for highly accurate and smooth patterning of curved and intersecting optical waveguides and gratings. Dielectric layers of $SiO_2$, $SiN_x$, or polyimide may be used as needed and etched by conventional isotropic, parallel-plate, dry methods.

Regrowth of heteroepitaxial material and ion implantation require special consideration. If it is desired to integrate active light-emitters and absorbers with passive components it may be required that one or both of these technologies be added to the list. Lasers and detectors can be integrated without these methods (G. Allen Vawter, et al., "Monolithically Integrated Transverse-Junction-Stripe Laser with an External Waveguide in GaAs/AlGaAs," *IEEE J. Quantum Electronics* 25:2, page 154, Feb. 1989) but severe performance limitations often result. The case against regrowth is that it is difficult and requires very high temperatures which may damage other portions of the circuit. At the expense of omitting active sources and detectors from the steering system PIC, regrowth is not preferred. The relative merits of ion implantation are less clear. Use of proton implantation for electrical isolation is reliable but sensitive to the moderate (circa 400° C.) processing temperatures used in contact alloying. Disordering of quantum wells by ion-implantation has been used to blue-shift the absorption edge of quantum-well waveguides, which allows integration of active sources with disordered passive devices but makes fabrication of biased p-n junction modulators difficult.

Set of Devices Given Process Set

Having decided which process steps are permitted in steering system PIC fabrication (optical and electron-beam lithography, RIBE, lift-off metalization and selective area plating, $SiO_2$, $SiN_x$, and polyimide dielectrics, and dry-etch for dielectric window etches), the task of selecting the devices that make up a set of parts from which to assemble PICs becomes possible. A sufficient variety of devices is needed such that useful PICs may be assembled, and all of the devices must be designed for interchangeability and process compatibility. However, an excessive quantity of different device structures may complicate the final design rules without adding a proportionate amount of additional potential function to the PICs fabricarable. For this reason, it is preferred to minimize the number of different devices in the present PIC device set of the invention.

From a processing viewpoint, one of the simplest devices to fabricate in integrated form with passive, low-loss, optical waveguide interconnects is the waveguide phase modulator. Phase modulators of the depletion-edge-translation type fabricated in GaAs/AlGaAs have low insertion loss, $<2.5$ cm$^{-1}$, and high modulation efficiency, $>81°/V$-mm, at 1.06 $\mu$m wavelength. Furthermore, referring to FIG. 6, the device may be fabricated in a ridge-optical-waveguide form 80 well-suited for passive optical waveguide interconnection between devices. Thus, if the epitaxial material is grown as a GaAs/AlGaAs waveguide with a doped p-n junction 81 designed for optimum phase modulation efficiency under reverse bias, the ridge waveguides used to define the phase modulator may simply be extended, without metalization, for use as interconnects. In this scheme, the only difference between a phase modulator and an interconnecting waveguide is that modulators have ohmic contacts 82 on the rib. The entire PIC will then have the same optical loss as the phase modulator, 2.5 cm$^{-1}$ at 1.06 $\mu$m wavelength. The phase modulator device is discussed in more detail, infra.

Figure 7:
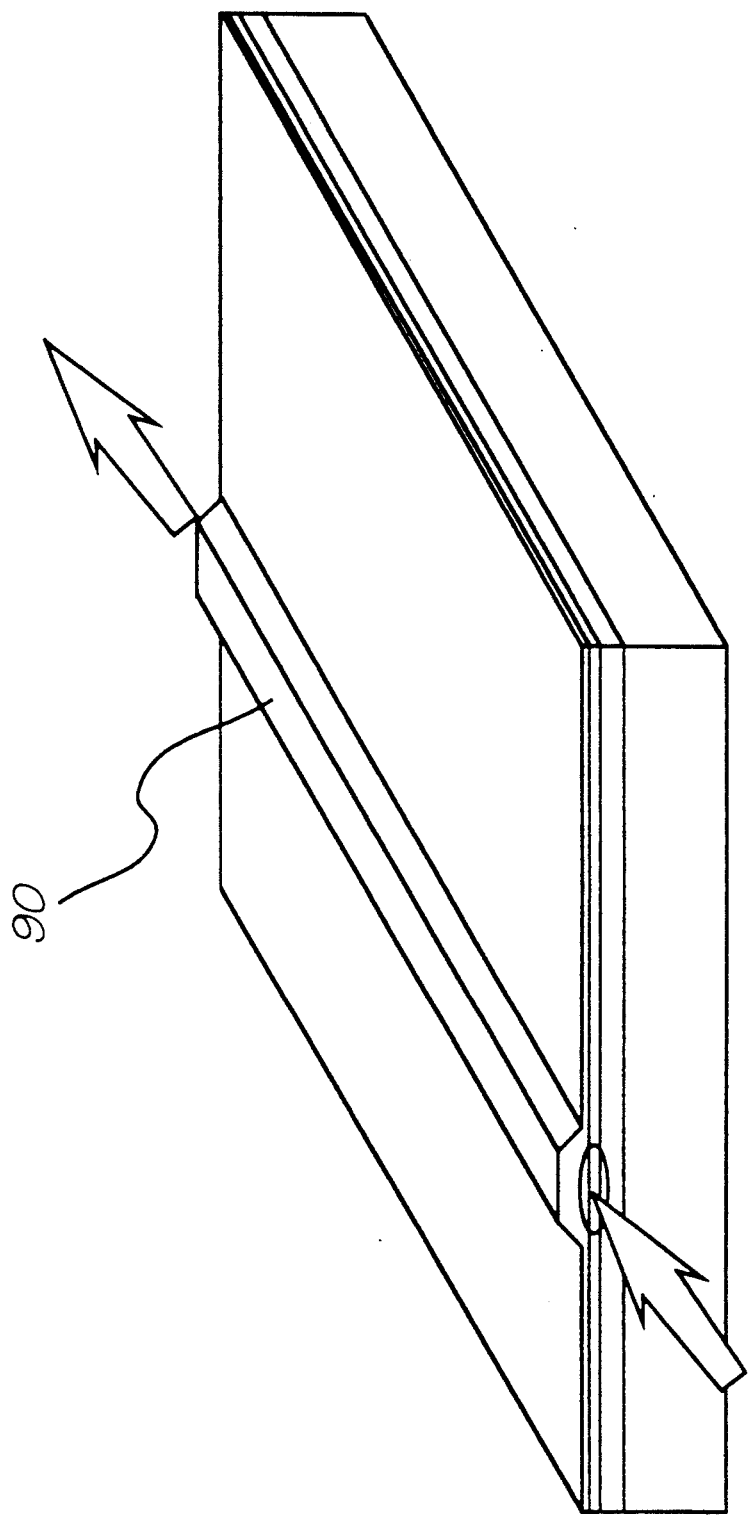
FIG. 7 is a perspective cut-away view of the preferred etched rib waveguide.
Figure 8:
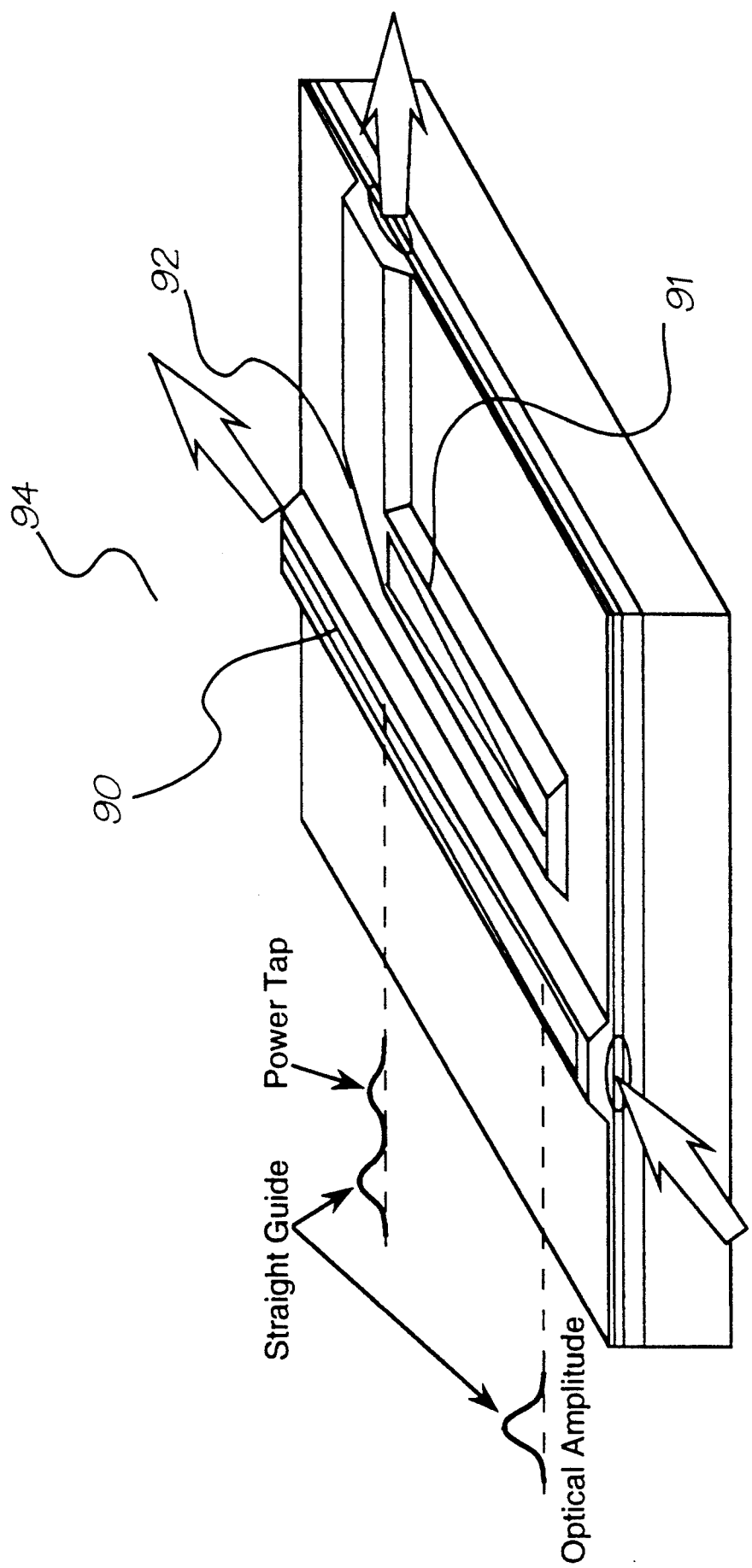
FIG. 8 is a perspective cut-away view of the preferred directional coupler and optical power splitter with turning mirror.
Figure 9:
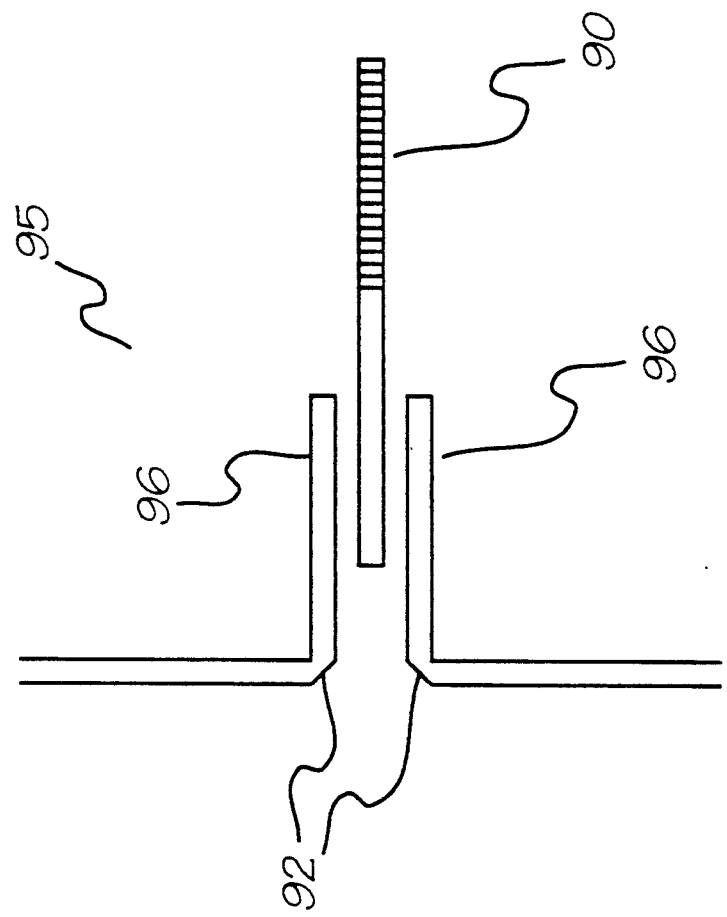
FIG. 9 is a perspective cut-away view of the preferred directional coupler and optical power combined with turning mirror.

As already mentioned, rib waveguides 90, shown in FIG. 7, are well suited to the present process technology and work well as interconnections between devices. Waveguide bends and branches are also important in the layout of PICs. Bends are needed for alignment and routing of signals while branches allow splitting and recombining of signals. Bends are implemented in the present process at the mask-layout level with little difficulty while splitters and combiners require careful process control but are otherwise compatible with the process set. The preferred splitter 94 and combiner 95, shown in FIGS. 8 and 9, is the waveguide directional coupler. This configuration requires only that two or three rib waveguides be placed side-by-side such that power is split from the single input guide 90 to the one or two output guides 91, or vice versa, by evanescent mode coupling. The degree of power transfer is fixed by the etch depth of the waveguide ribs and the spacing between them. Although the process steps are simple, the tolerances are tight. In order to fabricate a $-3$dB splitter without added metal pads to adjust the split ratio after fabrication, it is expected that 0.1 μm linewidth and 0.02 μm etch control are needed. Electron-beam direct-write lithography is capable of maintaining these linewidth tolerances while RIBE with careful in-situ etch monitoring is capable of the etch control required. An alternative approach is to use conventional y-junctions as are commonly seen in lithium niobate waveguide circuits. With the alternative, fabrication tolerances for the etch depth are somewhat relaxed but efficient mode splitting still requires precise control of the linewidth and shape of the branch section. Either of these splitter/combiners is adequate to the present invention.

Compact PICs require sharp waveguide bends for signal routing. Since radiation losses of a uniform radius bend do not allow sharp bends, total-internal-reflection turning mirrors are preferred. (H. Appleman et al., "Self-aligned chemically assisted ion-beam-etched GaAs/AlGaAs turning mirrors for photonic applications," *IEEE J. Lightwave Tech.* 8:1, page 39, Jan. 1990.) These may be fabricated using a self-aligned process of two RIBE steps resulting in highly accurate mating of a shallow-etched rib waveguide with the deeply-etched 45° turning mirror. FIG. 8 illustrates a rib-waveguide directional coupler 94 with output to a turning mirror 92, and FIG. 9 illustrates a rib-waveguide directional coupler 95 with input from two turning mirrors 92.

Figure 10:
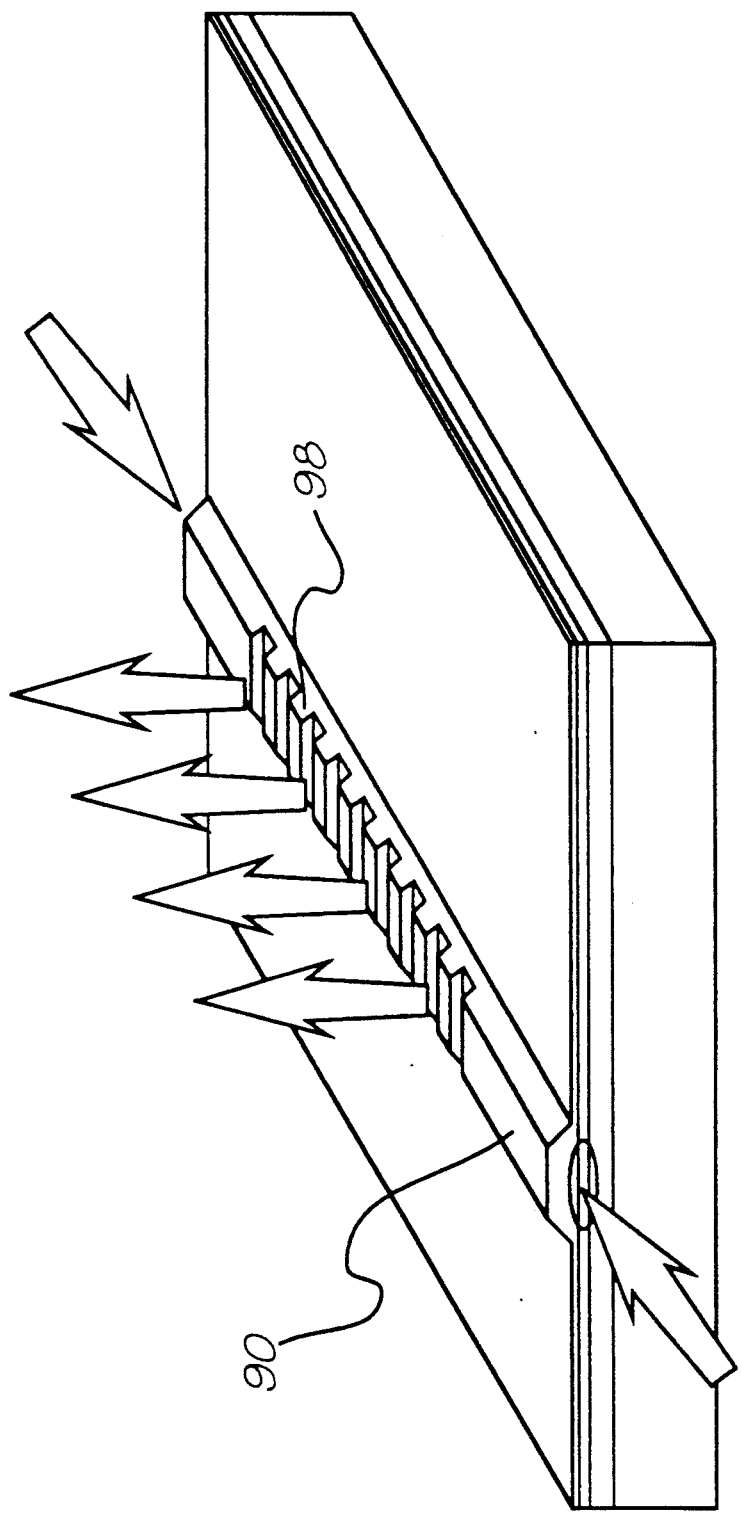
FIG. 10 is a perspective cut-away view of the preferred output coupler of the invention.

Output and input coupling to PICs may be performed at cleaved facets with butt-coupled fibers but some circuit configurations may require input/output normal to the chip surface. For such applications, gratings 98 are preferably etched across the waveguide 90 such that the first-order diffraction is surface-normal, as illustrated in FIG. 10. Alternatively, a notched turning mirror may be employed.

Optical waveguide amplitude modulators form another potentially useful class of PIC devices. There are, however, a number of drawbacks to the use of these structures in PICs. Most recent amplitude modulators in III-V semiconductors employ multi-quantum-well waveguides and the Quantum Confined Stark Effect (QCSE) under reverse bias of the waveguide layers. (J. E. Zucker et al., "Low voltage phase modulation in GaAs/AlGaAs multiquantum well optical waveguides," *Electron. Lett.* 24, page 112, 1988.) These devices only operate at wavelengths near the excitonic absorption edge of the quantum wells such that under an applied electric field the waveguide absorbs more light due to the stark-shift of the $n=1$ exciton. The on-off ratio of these devices can be quite large with low applied voltages but the insertion loss is also necessarily large because the operating wavelength is very close to the band-edge of the unbiased quantum wells. The large insertion losses of $>50$ cm$^{-1}$ inherent in the design of QCSE modulators make them unsuitable for any PIC application where regrowth or implantation will not be used to shift the absorption edge of the interconnecting waveguides. Vertically integrated waveguides such as the Integrated Twin Guide (Y. Suematsu et al., *IEEE J. Quantum Electronics* 11, page 457, 1975) and other vertical coupled-mode schemes (Vawter et al., supra) could be used to shift the optical signal up into the modulator, but these add process complexity and will not be considered further.

Figure 27:
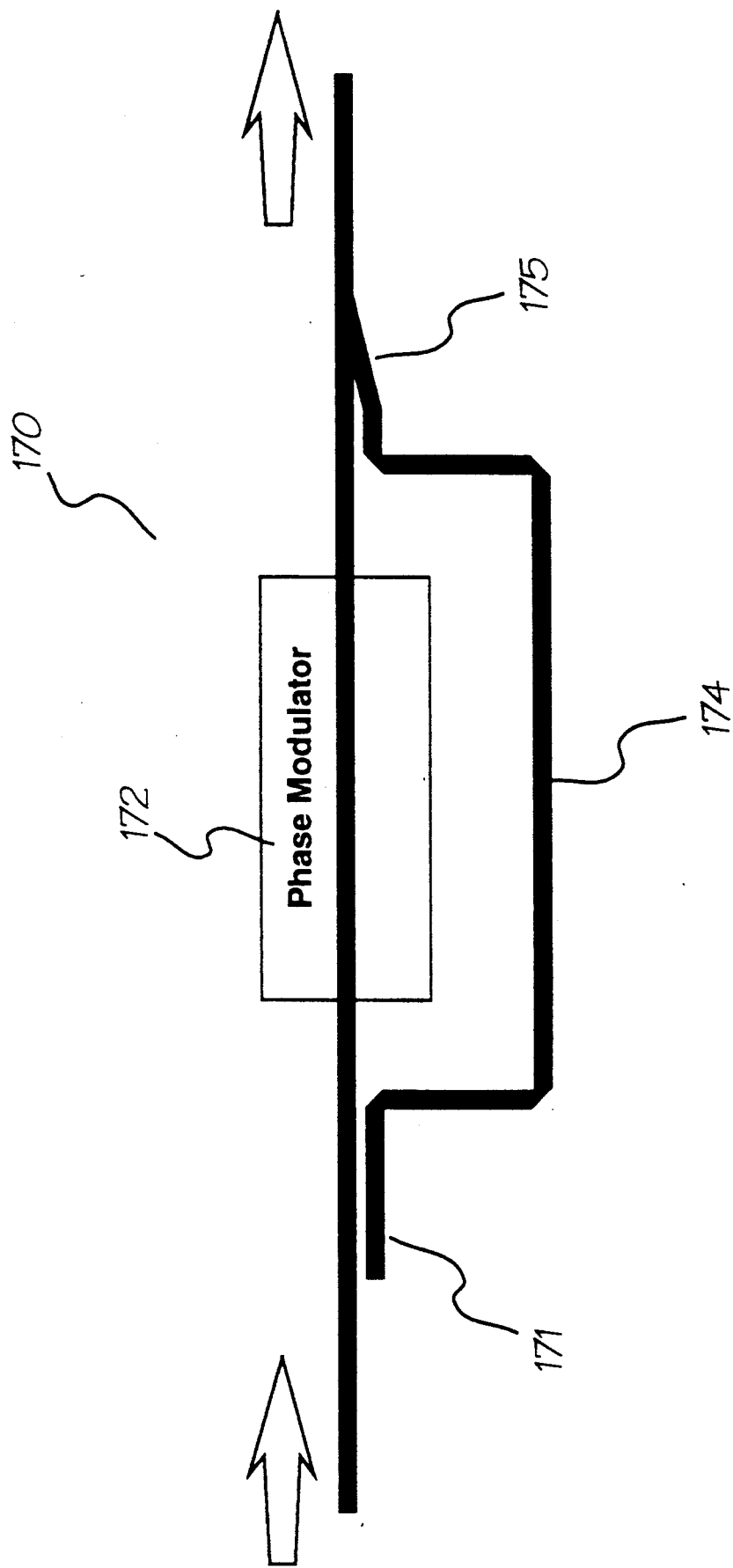
FIG. 27 is a schematic diagram of the preferred circuit for performing amplitude modulation using phase modulation.

It should be noted, however, that amplitude modulation may be performed using the present process set, as illustrated in FIG. 27. In an amplitude modulator 170, coherent light is split 171 into an unmodulated waveguide 174 and to a phase modulator 172, which split streams are recombined 175 to produce an amplitude modulation.

Fabrication Sequence

All of the above mentioned devices are suited to the above set of process technologies and can, with relatively few constraints, be placed in any order within the PIC. Single mask level, self-aligned processes are preferred when attempting to align individual devices such as modulators, waveguides, turning mirrors, and gratings. One very useful result of the limited selection of processes is that all of the devices are fabricated primarily by one or two RIBE etch steps and all of them share the same initial waveguide etch. This allows one etch step to define the geometry of the entire PIC in the first process step. Based on this self-aligned approach, the process sequence is as follows. First the wafer is masked with a tri-level dry-etch mask of hard-baked photoresist, titanium, and a top layer of electron-beam resist patterned for the fundamental waveguide circuit complete with couplers, turning mirrors, gratings, branches, and phase modulators. Electron-beam direct write lithography is used for this most critical step in order to maintain control of waveguide linewidth, coupler spacing, branch shape, and grating size. Chlorine RIBE and oxygen RIBE are now used in sequence to transfer the electron-beam resist pattern into the hard-bake photoresist. Alternatively, a single layer of optically exposed photoresist with hardbaking and/or deep ultra-violet exposure after development of the pattern and prior to waveguide etching may be used. Although simpler, this technique does not provide the accuracy and resolution of electron-beam direct write lithography. Another chlorine RIBE step is used to etch the rib waveguide to the correct depth. As the depth of this etch is critical for correct operation of the directional-coupler-type power splitters, in-situ optical interferometry is used to determine the real-time etch rate and depth. Leaving the hard-baked resist in place, another layer of photoresist is patterned by conventional or electron beam lithography with openings for the deep turning-mirror etch. The openings will self-align to the hard-baked resist used to define the actual mirror surface, and this mask level may also include any deep etches needed for electrical or optical isolation. Chlorine RIBE is again used to complete the deep turning-mirror etch and both mask levels are removed. With just two etch steps, all the optical structures are complete. The wafer is now coated with a dielectric of $SiO_2$, $SiN_x$, or polyimide, openings are etched over the waveguide layer where phase modulators are needed, and ohmic metal deposited by lift-off or plating for contact to the phase modulators. After application of the substrate ohmic contacts, the PIC is complete.

This straight-forward process sequence is the direct result of minimization of process types, minimization of device types, omission of active sources and detectors, and designing of each device to fit the same process sequence as all the other devices. As a result, PICs designed to use the process and device set of the present invention will have a relatively high manufacture yield and low cost.

PIC Circuit Components Conclusion

Figure 11:
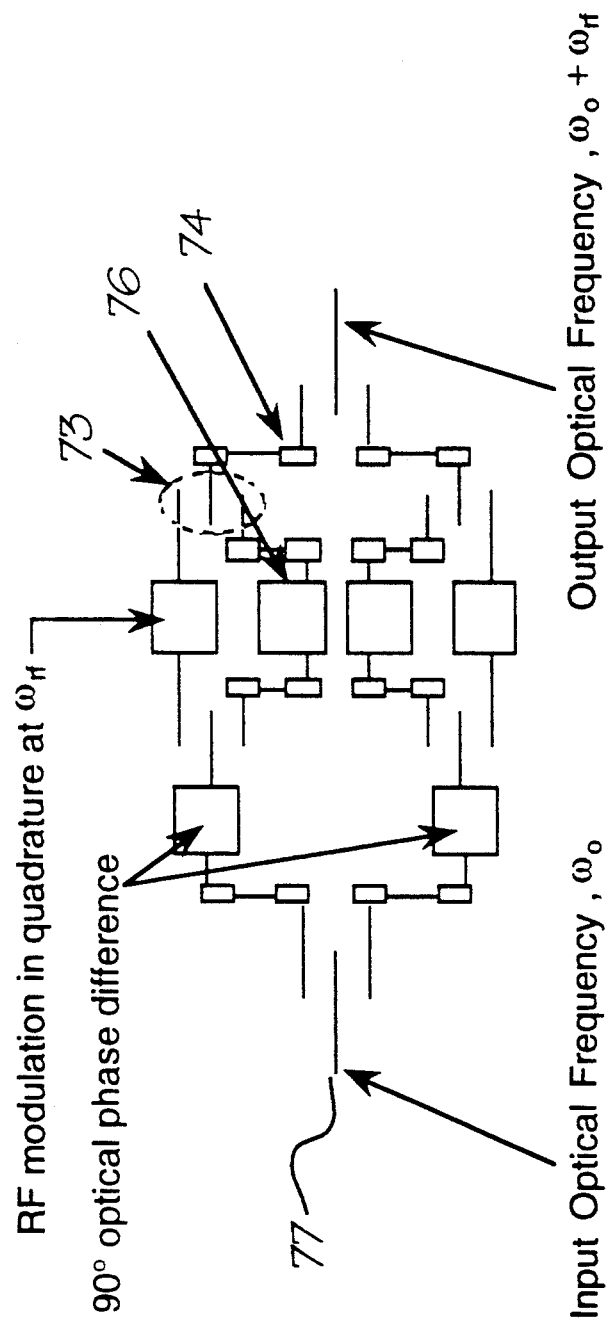
FIG. 11 is a schematic diagram of an integrated optical frequency shifter constructed using the fabrication process and device set of the present invention.

A large number of possible PICs can be constructed using the process and device set of the present invention. The common denominators of any PIC designed for a technology with no active sources/detectors and whose only active devices are phase modulators are that laser sources and detectors must be located off-chip, coupled with the chip by optical fiber, and all optical processing will be coherent optical heterodyne or homodyne. These circuits fill a need for a number of different coherent optical signal processing applications, including optical frequency shifting (see FIG. 11) for FM modulation as well as local oscillator or beat-frequency generation (the device uses only waveguides 77, splitter/combiners 73, turning mirrors 74, and phase modulators 76); tunable optical filters (MUX and deMUX, see FIG. 26 and Example 4, infra); secure optical links; and the phased-array antenna steering system of the present invention (see FIG. 5). All of these PICs use an optical power supply consisting of a single-frequency, narrow-linewidth laser whose fabrication and packaging are optimized for the requirements of a high-performance laser.

Steering System PIC Construction

The present invention presents an alternative to copper- or fiber-based phase control systems, which alternative is to incorporate a single PIC as the antenna controller. A single PIC may function as the controller with optical fiber carrying low-power phase control signals to recovery circuitry at each antenna element. The radar frequency would be input to the PIC as a low-power CW, pulsed, and/or chirped, electronic signal with the phase information for each element supplied in analog or digital format from a control computer. The PIC itself then takes the input RF frequency information along with the electronic phase control signal input for each element and generates an optical output to each antenna element containing both instantaneous frequency and phase information. A single photodetector with recovery circuitry at each element then converts the optical signal into RF at the correct frequency and phase. The benefits of this approach are the extreme small size and light weight of the PIC (the entire package may be only a few centimeters on a side) as well as the robust nature of a fully integrated optical circuit with a minimum of parts.

The PIC of the invention is based on an optical circuit technology employing only waveguide phase modulators (Wu et al., "Miniature Optical Waveguide Modulator in AlGaAs/GaAs Using Carrier Depletion," *Electronics Letters* 22:6, page 328, Mar. 13, 1986), waveguide interconnects, corner reflectors, and power splitter/combiners. All of these devices are easily integrated with each other on the same chip. In the present invention the chip is intended to operate at 1.06 or 1.33 $\mu$m wavelength and is fabricated from GaAs/AlGaAs material. A schematic layout of the complete circuit is given in FIG. 5. In this circuit, narrow-linewidth laser light is brought in from off-chip via a butt-coupled optical fiber. A portion of this light is then sent through an optical frequency translation circuit and frequency shifted by the desired microwave frequency. This light is then split into n channels, where n is the number of phase elements in the antenna. An optical phase delay equal to the desired microwave phase delay is applied to each channel. After the phase delay is applied, the processed beam and a portion of the unprocessed beam are coupled into an optical fiber and sent to a photodetector at the antenna element where they are mixed and the microwave frequency and phase is injected into recovery circuitry and power amplifiers for broadcast.

Figure 6:
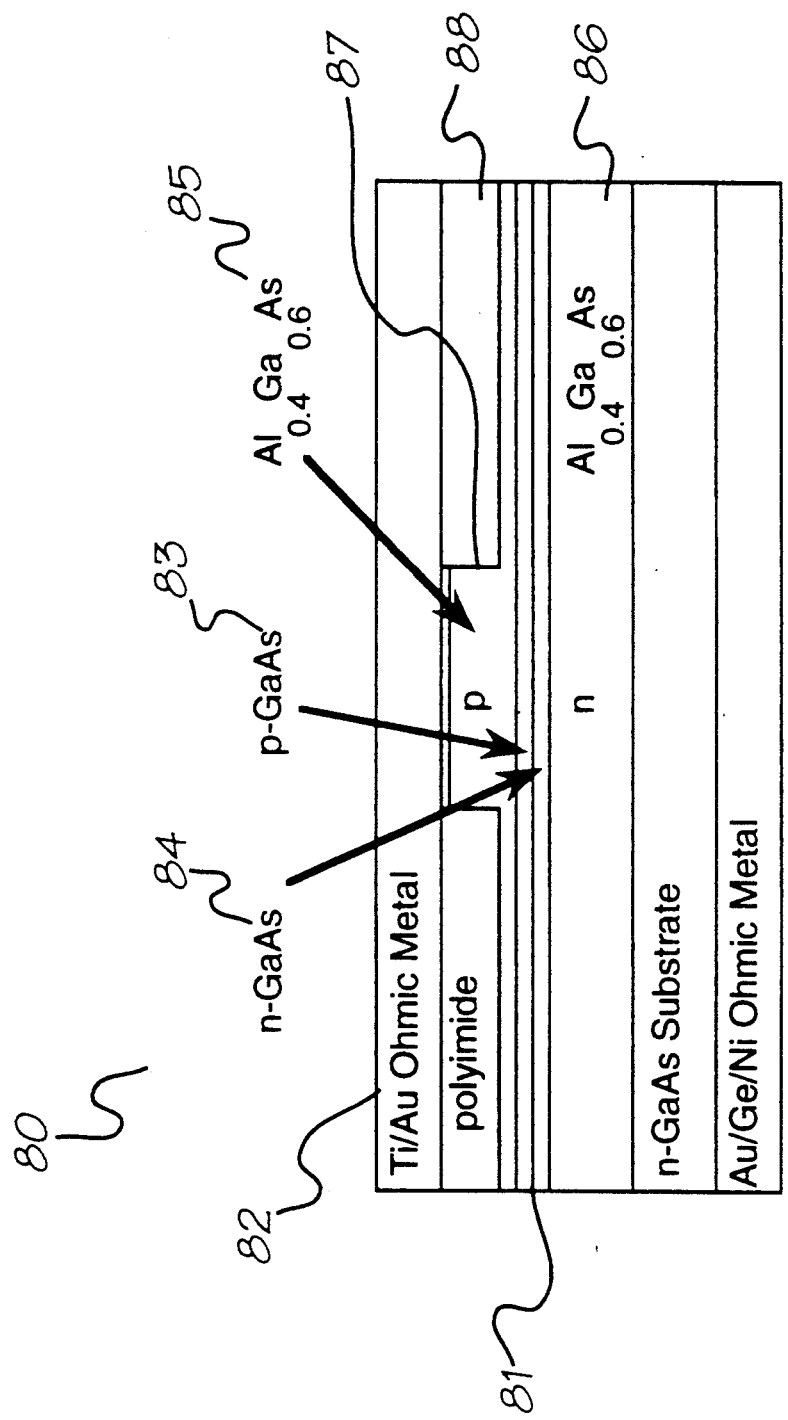
FIG. 6 is a cross section view of the preferred ridge waveguide phase modulator of the invention.

The PIC uses only phase modulators as active elements to achieve a complex coherent beam modulation. As such, design of the phase modulator is key to the operation of the circuit. Principal design aspects are that the device be of low optical loss, high phase modulation efficiency, and compatible with the passive circuit elements (i.e, waveguides, couplers, corner reflectors, and optical fiber output connectors). FIG. 6 illustrates the phase modulator 80 design of the PIC. It is a ridge-type waveguide GaAs/AlGaAs double heterostructure design with the p-n junction 81 centrally located between the GaAs waveguide layers 83 and 84. The shallow etched-ridge waveguide design allows direct transitions from the phase modulator into directional couplers or other elements with a minimum of process steps. The device works by changing the modal index of the waveguide under varying reverse bias, but the local refractive index of the material is changed only in the depletion zone of the p-n junction. Therefore, it is preferred to place the p-n junction in the middle of the waveguide to maximize the confinement of the optical mode in the reverse-biased depletion zone, such that as much of the optical energy as possible is inside the region of the junction swept by the depletion zone under changing bias conditions.

Total thickness of the GaAs layers 83 and 84 and the Al mole fraction of the cladding layers 85 and 86 must be chosen to minimize the width of the optical mode perpendicular to the layers, parallel to the applied electric field. A shallow etched-ridge single-mode waveguide design employs vertical sidewalls 87 formed by chlorine reactive-ion-beam etching for low optical loss (R. J. Deri et al., "Rib Profile Effects in Semiconductor Optical Waveguides," *Appl. Phys. Letters* 53:16, page 1483, 1988) compared to the tilted walls commonly seen in wet-chemical etching. The rib etch is preferably stopped 200 run above the GaAs layer 83. Ohmic contacts 82 to the p-type surface were placed over a planarizing layer of polyimide 88. Contact to the n-type side was made at the bottom of the substrate.

The four detailed physical phenomenon responsible for the net shift in modal index of the guide are: (1) the linear electrooptic effect related to the biaxial birefringence of the material under an applied electric field; (2) the electrorefractive effect, or Franz-Keldysh effect, which causes a red-shift of the absorption edge under an applied electric field which corresponds to a refractive index change via the Kramers-Kronig relations; (3) the plasma effect due to free-carrier absorption altering the refractive index as free-carriers are removed from the material by the depletion edges of the p-n junction; and (4) the band-filling effect which causes a red-shift of the fundamental adsorption edge and an increase in the refractive index upon depletion of free carriers from doped material. All four effects contribute to the total shift in modal index of the waveguide, although for energies well below the band-edge of the material the linear electrooptic effect dominates, followed by band-filling, electrorefraction, and the plasma effect in that order. For discussion of these four effects and their influence on phase modulators, see Mendoza-Alvarez, et al., "Analysis of Depletion Edge Translation Lightwave Modulators," *IEEE J. of Lightwave Tech.* 6:6, page 793, June 1988.

The phase modulator design, as shown in FIG. 6, maximizes modulation efficiency by using a 0.25 $\mu$m n-type and p-type GaAs waveguide regions 83 and 84 sandwiched between two $Al_{0.4}Ga_{0.6}As$ cladding layers 85 and 86. Total thickness of the GaAs layer and the Al mole fraction of the cladding layers are chosen to minimize the width of the optical mode perpendicular to the layers, parallel to the applied electric field. The p-n junction 81 is placed in the middle of the GaAs waveguide to center the depletion zone on the optical mode and maximize the influence of the applied electric field and depletion-edge translation on the modal index. The lateral extent of the waveguide does not influence the modulation behavior and so is designed as a single-mode ridge-type guide for compatibility with the PIC and low loss. The starting material is preferably grown by molecular-beam-epitaxy or metal-organic chemical-vapor-phase deposition, the ridge etched by chlorine reactive-ion-beam etching, and ohmic contacts to the p-type surface placed over a planarizing layer of polyimide. Contact to the n-type side is preferably made at the bottom of the substrate.

It is preferred to establish direct digital phase control of each antenna element. The PIG of the present invention accomplishes this by using digitally segmented phase modulators as the output phase control for each element. Due to the distributed nature of optical waveguide phase modulators, it is possible to adjust the phase shift at a fixed bias by changing the length of the device. Digital controlled phase modulation is disclosed in a U.S. patent application filed on Mar. 19, 1992, entitled *Digitally Controlled Distributed Phase Shifter*, by the present inventors.

Wavelength Selection in GaAs/AlGaAs PICs Using Phase Modulation

Efficient modulation with minimum insertion loss is the goal of all good phase modulation devices. In III-V semiconductor devices such as GaAs/AlGaAs, this requirement involves a compromise between high phase modulation Figure-of-Merit (FOM), the amount of relative phase delay per volt applied bias change per millimeter device length, and low optical transmission modulation. This is due to the fact that fully one-half of the phase modulation effect is due to physical phenomena that become stronger as the device operates at wavelengths closer to the absorption edge of the material. (J. Mendoza-Alvarez et al., supra.) However, operating the device near the adsorption edge increases the optical loss of the waveguide due to such effects as bandtail absorption and the Franz-Keldysh effect. Bandtail absorption manifests itself as an increased minimum absorption in the waveguide while the Franz-Keldysh effect results in modulation of the transmitted optical amplitude with applied electric field.

One very liberal definition of the dividing line between a phase modulator and an amplitude modulator is that a phase modulator shall cause less than 3 dB amplitude modulation and an amplitude modulator less than $\pi$ radians of phase modulation over the operating range of device. However, practical systems employing phase modulation in coherent systems, such as the present invention, may be much more stringent in their requirements. The present invention, in which multiple waveguide phase modulators connected in series and coherent beam modulation are used, is susceptible to signal degradation caused by unwanted amplitude modulation. Therefore, to improve the overall signal quality, it is preferred to operate the waveguide phase modulators in a regime with a minimum of amplitude modulation.

The number of wavelengths suitable for operation of GaAs/AlGaAs PICs is limited to a few ranges of values. These are: 820-860 nm (conventional diode lasers); 900-1000 nm (strained quantum-well diode lasers); 1064 nm (Nd+ YAG); 1319 nm (Nd+ YAG); 1330 nm and 1550 nm (lattice matched quaternary diode laser). Among these wavelengths, 1 $\mu$m or less are too close to the band edge for low insertion loss. The 1330 and 1550 nm wavelengths are excellent in terms of insertion loss, however, the commercially available diode lasers at these wavelengths are of low output power and do not have the extremely narrow emission linewidth that is available with the Nd+ YAG lasers (<10 KHz). (The narrow emission linewidth is desirable for frequency modulation of the beam.) The similar wavelength of the 1330 nm quaternary diode laser to the 1319 nm Nd+ YAG is an added benefit simplifying any future switch to quaternary diode lasers should the spectral properties of these devices improve. As a result, it is preferred to use GaAs/AlGaAs rib waveguide phase modulators at both 1064 and 1319 nm using diode-pumped ring-configuration Nd+ YAG lasers.

Fabrication of Directional Coupler Waveguides with Highly Accurate Control of Coupling Fabrication of large-area PICs in III-V compound semiconductors presents many fabrication complexities. One difficulty is precise and reproducible etching of ridge waveguides for accurate control of optical mode shape and coupling length (distance required for full power transfer) of optical directional couplers. Directional couplers are an important element in PICs due to their utility as power taps, splitters, and combiners. However, the exponential relationship between the depth of the etched-rib waveguide and coupling length makes these structures very difficult to fabricate with precise control of coupling. This inability to precisely control the coupling purely through tight process control has led to the use of electrically biased couplers where an electric field is applied across the waveguide to force the coupler into the desired switch state. Although biased couplers have proven successful, they are not desirable for large PICs due to the requirement of electrical contact to each coupler and careful custom tuning of the bias voltage across each coupler. The present invention provides for fabrication of directional couplers with precisely controlled coupling lengths that do not require bias-tuning after fabrication.

In the present invention, careful control of etch depth and coupling length is achieved through the use of in-situ reflection monitoring of the sample surface during nonselective $Cl_2$ reactive-ion-beam etching (RIBE) and incorporation of a periodic multilayer stack into the upper-cladding layer of the waveguide material. The process is discussed in detail in Example 2, infra.

This technique for monitoring of ridge waveguide etching in real time, with endpoint depth precision of $\pm 100$ Å independent of total depth, is directly applicable to PICs employing complex optical routing of waveguides, directional couplers, and y-junctions where total height of the waveguide plays a key role in performance of the circuit.

Analysis of Optical Frequency Translation by PIC

Many potential optical circuits exist using phase modulators in coherent homodyne or heterodyne applications. This section discusses the operating principle of optical frequency translation using both two-arm and four-arm interferometer configurations, first proposed in M. Izutzu et al., "Integrated Optical SSB Modulator/Frequency Shifter," *IEEE Journal of Quantum Electronics* QE-17:11, page 2225, Nov. 1981. Optical frequency translation is a critical function required for virtually all coherent optical systems. For example, all coherent optical systems proposed for RF phased array antenna steering require optical frequency translation. (E. N. Toughlian et al., "A Deformable Mirror-Based Optical Beamforming System for Phased Array Antennas," *IEEE Photonics Technology Letters* 2:6, page 444, June 1990; and A. Nickerson et al., "Optical Processor for Array Antenna Beam Shaping and Steering," *Optical Engineering* 30:10, page 1497, Oct. 1991.) An Optical Frequency Translator (OFT) performs the function of translating the frequency of coherent light by an amount equal to (or an integer multiple of) the frequency of an applied RF reference signal. To date, the most common technique used to perform optical frequency translation is through the use of acousto-optic (AO) modulators. AO modulators unfortunately are very limited in bandwidth (the amount of available frequency translation) and are quite inefficient both in required RF drive signal amplitude and optical conversion efficiency.

Single Phase Shifter

The spectral output of a sinusoidally driven phase shifter is well known from communication theory (K. S. Shanmugam, *Digital and Analog Communication Systems*, pp. 280-283, John Wiley & Sons, Inc., 1979) and have been used in the field of integrated optics previously (M. Izutzu, et al., above). The spectral output components are related by various order Bessel functions of the first kind ($J_n(\beta)$). Specifically:

$$E_{out} = E_c \cos(\omega_c t + \beta \sin(\omega_{rf} t)) = \tag{7}$$

$$E_c \sum_{n=-\infty}^{\infty} J_n(\beta) \cos[(\omega_c + n \omega_{rf}) t]$$

where $E_{out}$ and $E_c$ represent the modulators output and peak input optical electric fields, respectively; $\omega_c$ and $\omega_{rf}$ represent the angular frequencies of the optical and RF drive voltage, respectively; and $\beta$ represents the modulation index. The modulation index is the peak optical phase excursion caused by the drive voltage and can be expressed as:

$$\beta = V_p \cdot FOM \cdot L \tag{8}$$

where $V_p$ is the peak applied RF drive voltage, L is the phase modulators length, and FOM is the phase modulators figure of merit, which is the modulators phase change per unit voltage.length (degrees/volt-mm). In Eq. 7, n corresponds to the sideband "order." This is, n=0 is the optical carrier ($\omega_c$), n=+1,−1 are the upper and lower sidebands ($\omega_c \pm \omega_{rf}$), respectively; n=+2,−2 are the next highest order upper and lower sidebands ($\omega_c \pm 2\omega_{rf}$), respectively; and so on.

In the present invention, it is desired to combine the outputs of several phase modulators to produce phase cancellation of undesired spectral components. Therefore, it is critical to know the phase of the spectral components under all possible operating points. By careful observation of the complex Fourier series, the result given by Eq. 7 is extended to include arbitrary optical ($\Theta_c$) and RF ($\Theta_{rf}$) phase offsets. The output series then becomes:

$$E_{out} = E_c \cos(\omega_c t + \Theta_c + \beta \sin(\omega_{rf} t + \Theta_{rf})) = \tag{9}$$

$$E_c \sum_{n=-\infty}^{\infty} J_n(\beta) \cos[(\omega_c + n \omega_{rf}) t + \Theta_c + n \cdot \Theta_{rf}]$$

Note that the optical phase maps directly into all of the optical spectral components, whereas the RF phase maps into the optical sideband phases with an integer multiplication factor equal to the sideband's order. This proper phase mapping is critical in the analysis of multi-arm OFTs discussed in the following sections.

Figure 12A:
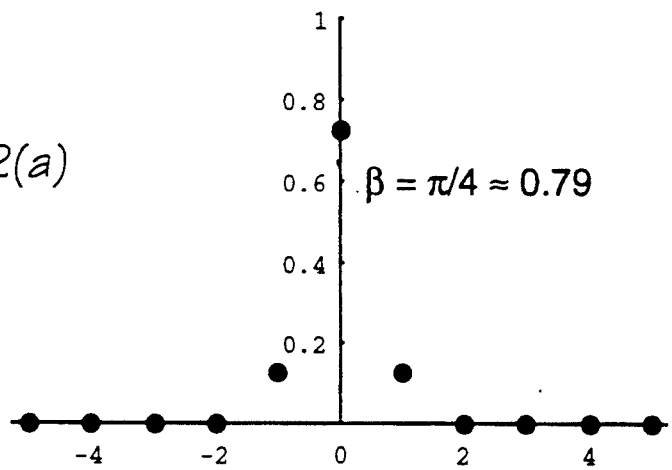
FIG. 12a, b, and c is a set of three graphs showing spectral components of a phase modulator driven by a sine wave with angular frequency $\omega_{rf}$.
Figure 12B:
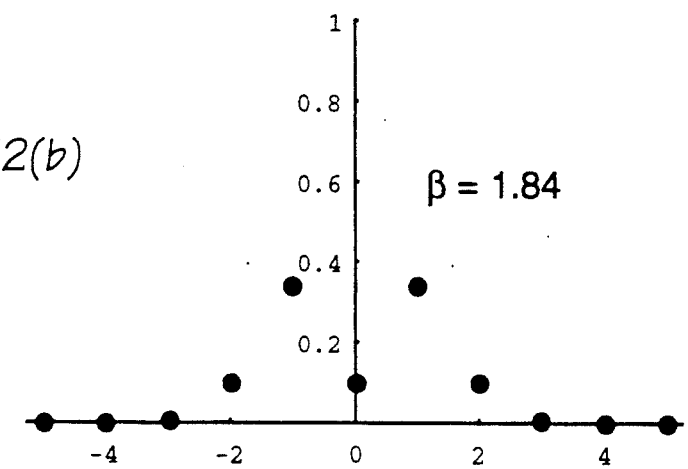
Figure 12C:
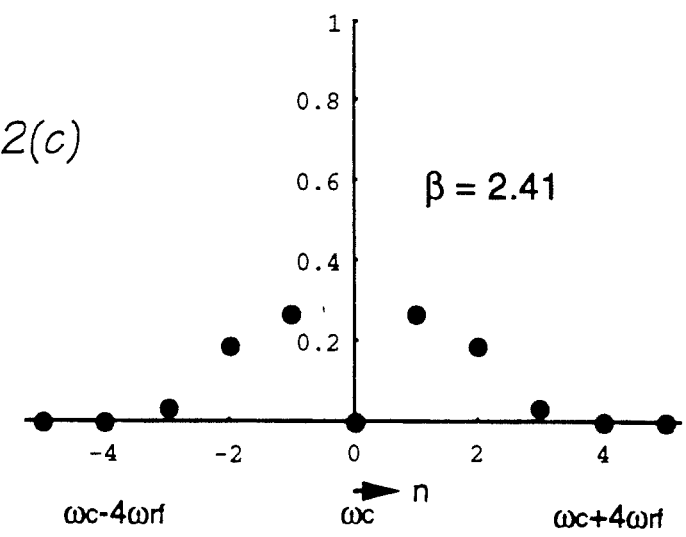

FIG. 12 shows plots of the theoretical optical spectrum from phase modulated light at several different drive amplitudes. At low drive levels ($\beta = \pi/4$) carrier power is "converted" into the fundamental sidebands (n=1). As the drive level is increased, significant power can be converted into the fundamental upper and lower sidebands with a maximum occurring at a drive level of $\beta \approx 1.84$ radians, as shown in FIG. 12b. A further increase in drive level can actually extinguish the carrier's power as shown in FIG. 12c, when $\beta \approx 2.41$.

Figure 13:
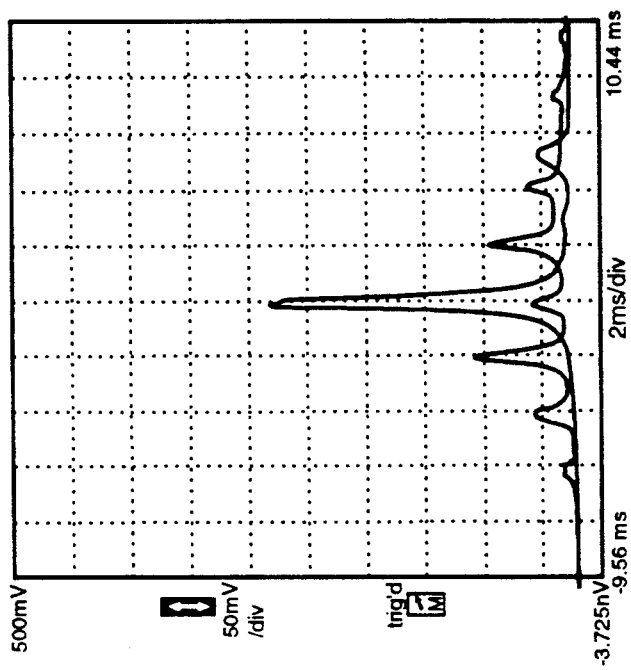
FIG. 13 is a graph showing experimental output spectrum from a sinusoidally driven optical phase modulator.

FIG. 13 shows the experimental output spectrum from an optical phase modulator driven with a Nd:YAG laser at 1.3 µm. Two spectrums are overlaid in FIG. 13. One is of the output without any electrical drive to the phase modulator (center large peak), whereas the other is with the electrical drive level set to maximize the power in the first order sidebands. The electrical operating frequency was 800 MHz. Notice the correspondence to the theoretical spectrum in FIG. 12b.

Figure 14:
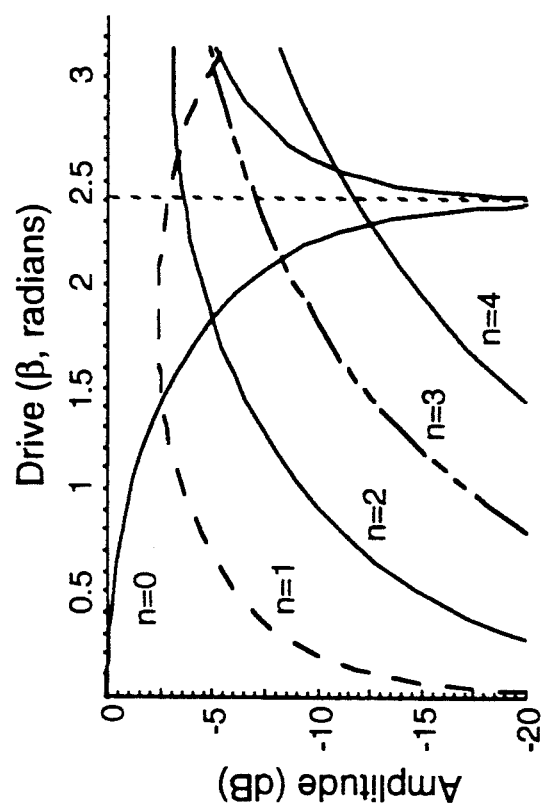
FIG. 14 is a graph showing theoretical spectral component power as a function of drive signal strength.

Since it is desired to produce sideband power as efficiently as possible, it is interesting to explore sideband power as a function of drive signal level. FIG. 14 shows a plot of the relative carrier and sideband powers as a function of drive signal level ($\beta$). Note that the carrier can be extinguished at a drive signal level of $\beta = 2.41$ radians and that significant higher-order ($|n| > 1$) sidebands are present at high drive levels. The high number of significant strength sidebands illustrates the high nonlinearity of the "linear" phase modulator.

Since carrier power can be converted with a reasonable efficiency into the upper and lower sidebands (n=±1, double sideband (DSB)), it would seem possible to produce an optical frequency translation by "phasing-out" one of the sidebands to leave a single-sideband (SSB) or equivalently a frequency translated optical signal. This is the approach that has been used by others (see Izutzu, et al.) and is used in all of the frequency translation circuits presented herein.

Two Arm OFT

Figure 15:
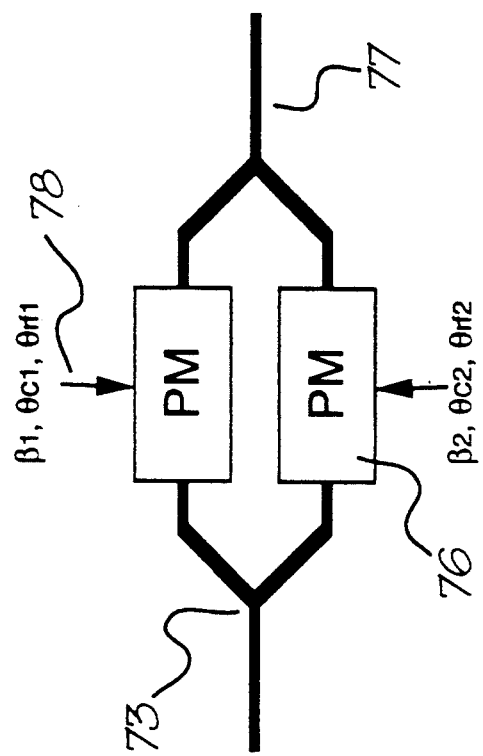
FIG. 15 is a schematic diagram of a two-arm interferometer.

Phase cancellation of one of the sidebands can be most easily achieved by combining two phase modulators 76 as shown in FIG. 15. Such a configuration is virtually identical to a Mach-Zehnder amplitude modulator. It differs in only two regards, as both arms must be accessible for modulation, and the phase modulators in both arms must be able to provide slightly over $2\pi$ radians of voltage-controlled optical phase shift (as compared to $\pi$ radians for a Mach-Zehnder). The operating point of the circuit is selected by the six parameters: $\beta_1$, $\beta_2$, $\Theta_{c1}$, $\Theta_{c2}$, $\Theta_{rf1}$, $\Theta_{rf2}$; shown in FIG. 15 on their respective phase modulator 76. The drive level, $\beta$, is controlled by the amplitude of the applied RF signal 78. The RF phase, $\Theta_{rf}$, is controlled by the phase of the RF drive signal 78. The optical phase, $\Theta_c$, can be controlled by the DC bias applied to the phase modulator.

The analysis of N-arm phase modulator structures is very straight forward with the result of Eq. 9. The optical signal is split 73 into N (N=2 in FIG. 15) optical paths 77 which are sinusoidally phase modulated and which produces a spectrum, as described by Eq. 9. The outputs of each of these N paths are then recombined to produce the resulting signal. Analytically, assuming a lossless and equal power split/recombination per path, the output becomes:

$$E_{out} = E_c \sum_{i=1}^{N} \sum_{n=-\infty}^{\infty} J_n(\beta_i)\cos[(\omega_c + n\omega_{rf})t + \Theta_{ci} + n\cdot\Theta_{rfi}] = \quad (10)$$

$$E_c \, Re\left\{ \sum_{n=-\infty}^{\infty} e^{j(\omega_c t + \Theta_c)} \sum_{i=1}^{N} J_n(\beta_i) e^{j(\Theta_{ci} + n\cdot\Theta_{rfi})} \right\}$$

where $\beta_i$, $\Theta_{ci}$, and $\Theta_{rfi}$ are the drive level, optical phase shift, and RF phase shift of the i-path, respectively. The second exponential-form in Eq. 10 is given for computational simplicity.

When $N=2$ and $\beta_1=\beta_2$, Eq. 10 can be simplified considerably, yielding:

$$E_{out} = \quad (11)$$

$$E_c \sum_{n=-\infty}^{\infty} j_n(\beta)\cos\left(\frac{1}{2}(\Delta\Theta_c - n\Delta\Theta_{rf})\right)\cos[(\omega_c + n\omega_{rf})t]$$

where $\Delta\Theta_c = \Theta_{c1} - \Theta_{c2}$ and $\Delta\Theta_{rf} = \Theta_{rf1} - \Theta_{rf2}$ are the optical carrier and RF phase offsets, respectively. From Eq. 11, one can see that there are three control parameters, $\Delta\Theta_c$, $\Delta\Theta_{rf}$, and $\beta$, for a two arm phase modulator circuit when equal drive power is applied to both arms. Note that all three of these parameters are electrically controlled. $\Delta\Theta_c$ can be controlled by the DC bias level applied to the arms. $\beta$ and $\Delta\Theta_{rf}$ are controlled by the amplitude and RF phase shift introduced into the electrical signals which drive the circuit. Due to this large number of parameters and the large nonlineartry of the basic phase modulator, there is a great variety in the possible spectral outputs. It is somewhat difficult to intuitively predict what will happen to the output at a given electrical operating point. It is, though, simple to calculate the exact output spectrum at any operating point using Eq. 10.

Presented in FIG. 16 are the output spectra at three interesting operating points. These three points are by no means the only interesting operating points, but they do appear to be the most relevant for optical frequency translation (at least when operating at the RF fundamental).

Figure 16A:
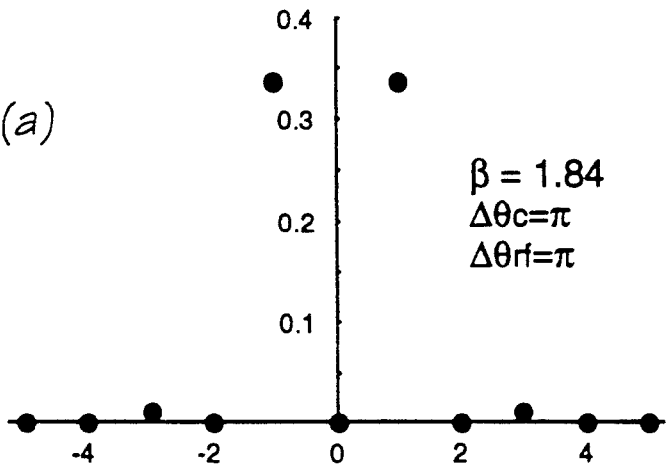
FIG. 16a, b, and c is a set of three graphs showing spectral components of a two-arm interferometer.

To begin with, it is interesting to drive the circuit with a push-pull configuration. The resulting spectrum is shown in FIG. 16a. The drive level ($\beta$) was selected to produce maximum first-order sideband power. The optical phase shift of $\pi$ (180°) cancels the in-phase spectral components from the two phase modulators. The RF phase shift of $\pi$ (180°) causes the even spectral components at the output of each phase modulator to be in phase and the odd to be $\pi$ out of phase. Thus, after combining the outputs of the two phase modulators, all even-order sideband spectral components are exactly canceled. Hence, a relatively clean double sideband signal results (3rd order is down $\approx 18$ dB from 1st order).

Figure 16B:
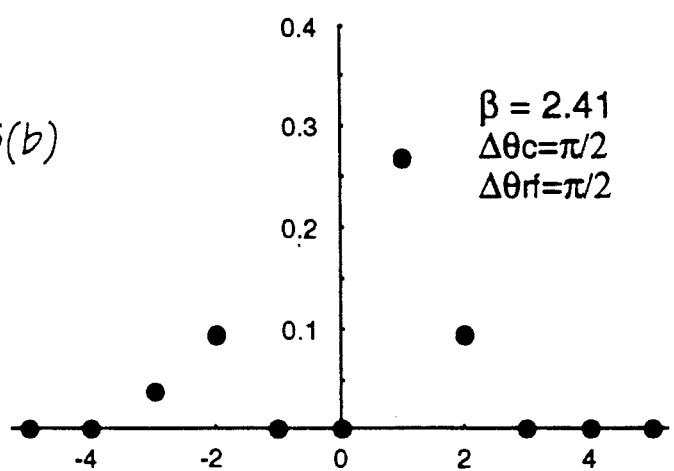

FIG. 16b shows the output spectrum from a two arm interferometer operated for single-sideband generation with the lower first-order sideband and carrier extinguished. Here the drive level is set for total carrier extinction at $\beta \approx 2.41$, as discussed in the previous section. The optical and RF relative phase shifts between the two arms are both set in quadrature in order to cancel the lower first order sideband. Using multipliers operated in quadrature is a well known approach in electronic circuits to produce SSB (see Shanmugam, pp. 271-272). Here the nonlinearities of a simple phase modulator are used instead of a multiplier. The cost of replacing the multiplier with a phase modulator is clearly evident in the output spectrum. Significant power is also converted into higher order sidebands. The $n=\pm2$ sidebands are only 4.6 dB down from the $n=1$ sideband. These spurious sidebands may have serious consequences in a coherent system.

Figure 16C:
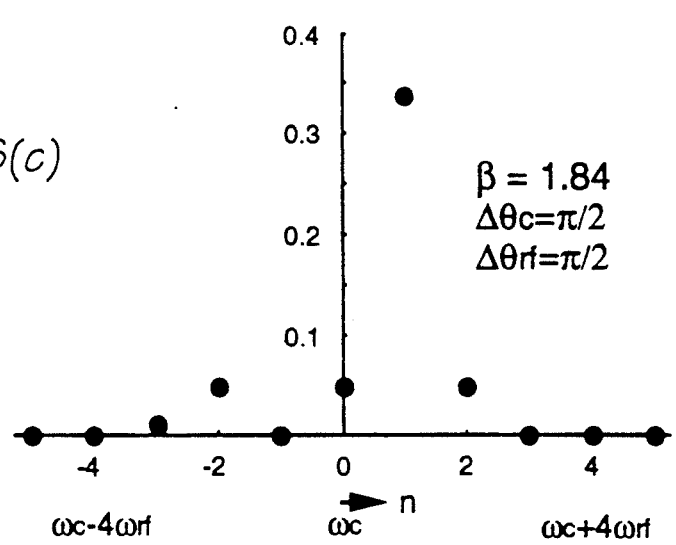

In order to reduce the power in the spurious sidebands, it is possible to reduce the drive level to the phase modulators from the condition of total carrier extinction. FIG. 16c shows the output spectrum when the drive level is $\beta = 1.84$. This drive level results in a maximum $n=1$ sideband power, as was discussed in the previous section. Interestingly, at this drive level, the carrier power increases to match the power in the spurious third-order sidebands. This operating point appears to be about the best that can be done for optical frequency translation using a simple two path interferometer. All spurious components are down 8 dB from the desired $n=1$ sideband component and the conversion efficiency exceeds 33% ($-4.8$ dB).

Four Arm OFT

Figure 17:
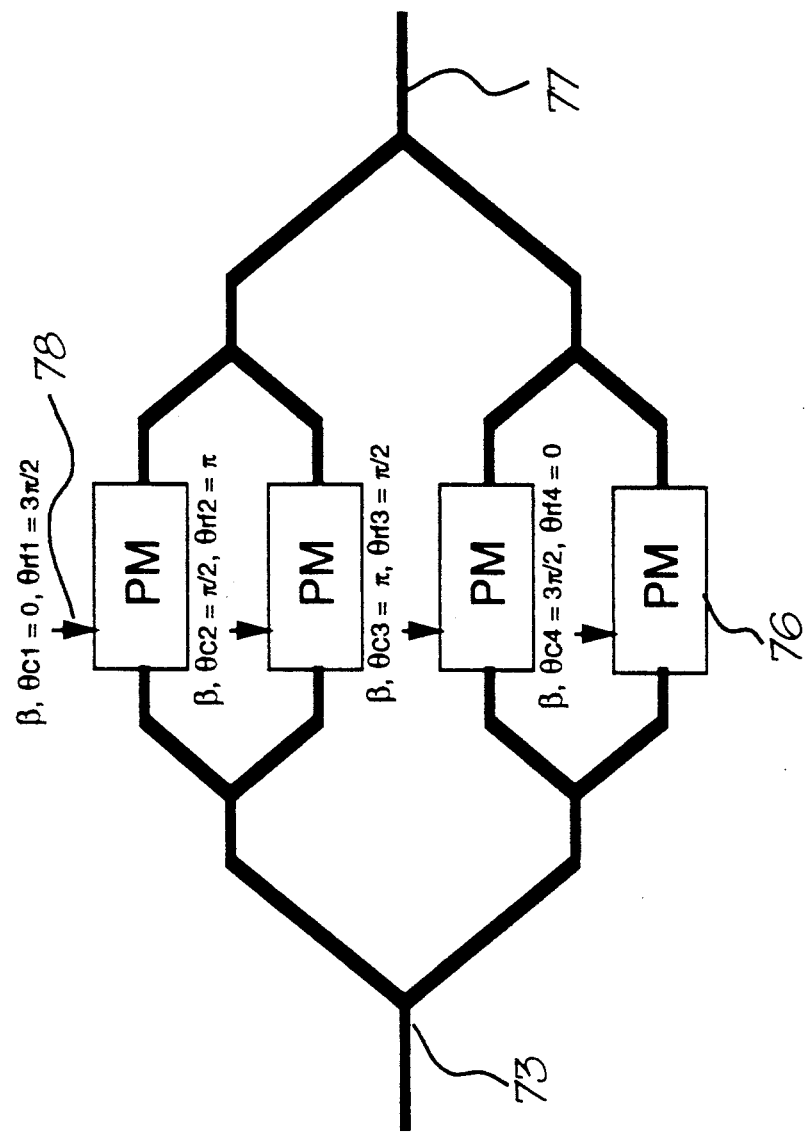
FIG. 17 is a schematic diagram of a four-arm interferometer, which is the theoretical basis for the optical frequency translator.
Figure 18:
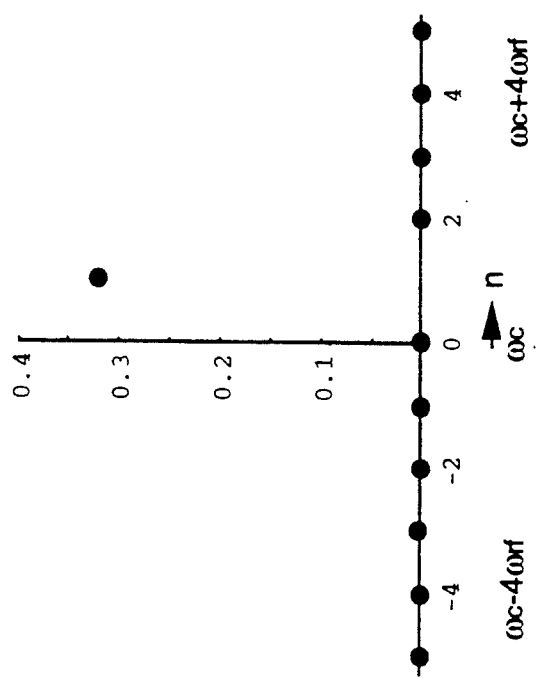
FIG. 18 is a graph showing output spectrum of a four-arm interferometer operated to produce a single sideband.

To further reduce spurious spectral components, a four path interferometer can be used as shown symbolically in FIG. 17. Here two of the operating modes discussed for the two path interferometer are combined to greatly improve the spectral purity of the output. To understand the operation of this circuit, the four arms should be thought of as two two-arm interferometers operated with push-pull drive. This results in the output spectrum of each set to be DSB as was shown in FIG. 16a. These two sets are further driven in quadrature in order to cancel the lower sideband component as was done in the spectra shown in FIGS. 16b and 16c. This results in the spectrum shown in FIG. 18. The relative optical phase shifts introduced in each arm of the interferometer are 0, $\pi/2$, $\pi$, and $3\pi/2$. The RF drive to each arm is $\beta = 1.84$ with relative RF phases of $3\pi/2$, $\pi$, $\pi/2$, and 0 radians. All spurious components are now down $>18$ dB from the desired $n=1$ sideband component and the conversion efficiency again exceeds 33% ($-4.8$ dB).

OFT Conclusions

An exact analytical approach to the analysis of optical frequency translations fabricated from optical phase shifters has been developed. The approach takes into account the actual nonlinearity of the phase modulators. The most promising approach is a four-arm interferometer circuit which should provide a conversion efficiency of greater than 33% ($-4.8$ dB) with all spurious components down $>18$ dB. The four-arm approach is used in the preferred embodiment of the invention.

EXAMPLES (INDUSTRIAL APPLICABILITY)

The invention is further illustrated by the following non-limiting examples.

EXAMPLE 1

Figure 19:
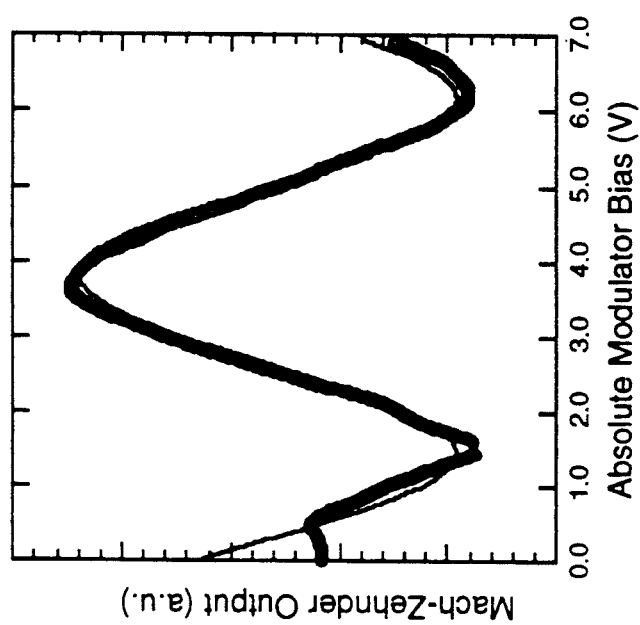
FIG. 19 is a graph of the output of a Mach-Zehnder interferometer with a 1 mm long ridge waveguide phase modulator in one arm.

Completed optical phase modulator devices according to FIG. 6 were cleaved into 1 mm lengths and mounted to copper stubs for testing at 1.06 $\mu$m wavelength with uncoated facets. The mounted device was placed in one arm of an external Mach-Zehnder interferometer and an infrared vidicon used to measure amplitude variations of the recombined beams. FIG. 19 shows interferometer intensity vs. applied reverse bias for a fully metalized 1 mm long modulator. Open circles are the measured data, the solid line is a cosine-squared fit to the data using a modulator phase shift of 76.5°/V. The excellent fit of the data indicates that the phase shift is extremely linear with applied biases greater than 2 volts.

Figure 20:
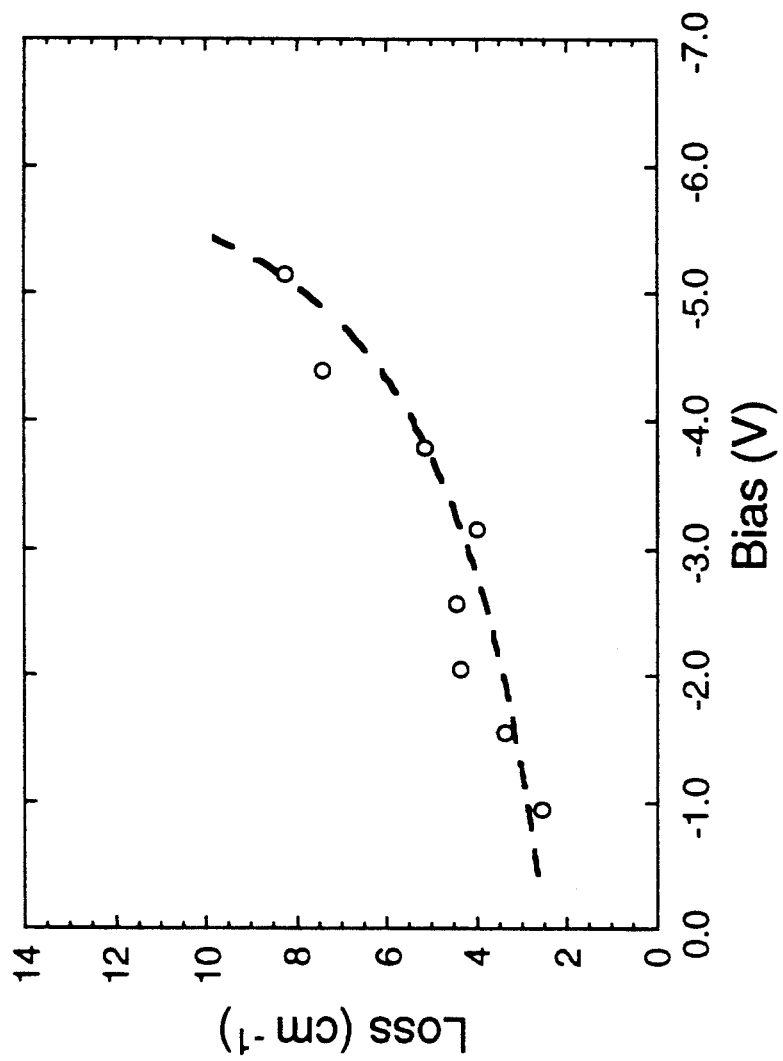
FIG. 20 is a graph of waveguide loss versus reverse bias of the structure shown in FIG. 6.

Due to the high reflection coefficient of the cleaved facets it is possible to directly measure the waveguide loss in these structures by blocking the passive Mach-Zehnder arm and measuring transmitted amplitude through the waveguide as a function of reverse bias. As the modal index of the guide varies with bias the Fabry-Perot cavity created by the facets shift in-and-out of resonance. The peak-to-valley ratio of the transmitted intensity is a direct measure of waveguide loss. (R. G. Walker, "Simple and Accurate Loss Measurement Technique for Semiconductor Optical Waveguides," Electronics Letters 21:13, page 581, Jun. 20, 1985.) FIG. 20 shows the waveguide loss vs. bias from this measurement for a 1 mm long guide. waveguide loss of these devices is between 2 and 5 cm$^{-1}$ and increases with increasing bias. The base value of 2 cm$^{-1}$ is due largely to scattering and free-carrier adsorption while the slope in the data is due to the red-shift in the GaAs adsorption edge with applied electric field Franz-Keldysh effect. We expect to reduce the base-line loss to below 1 cm$^{-1}$ as we improve the smoothness of our waveguide edges.

Figure 21:
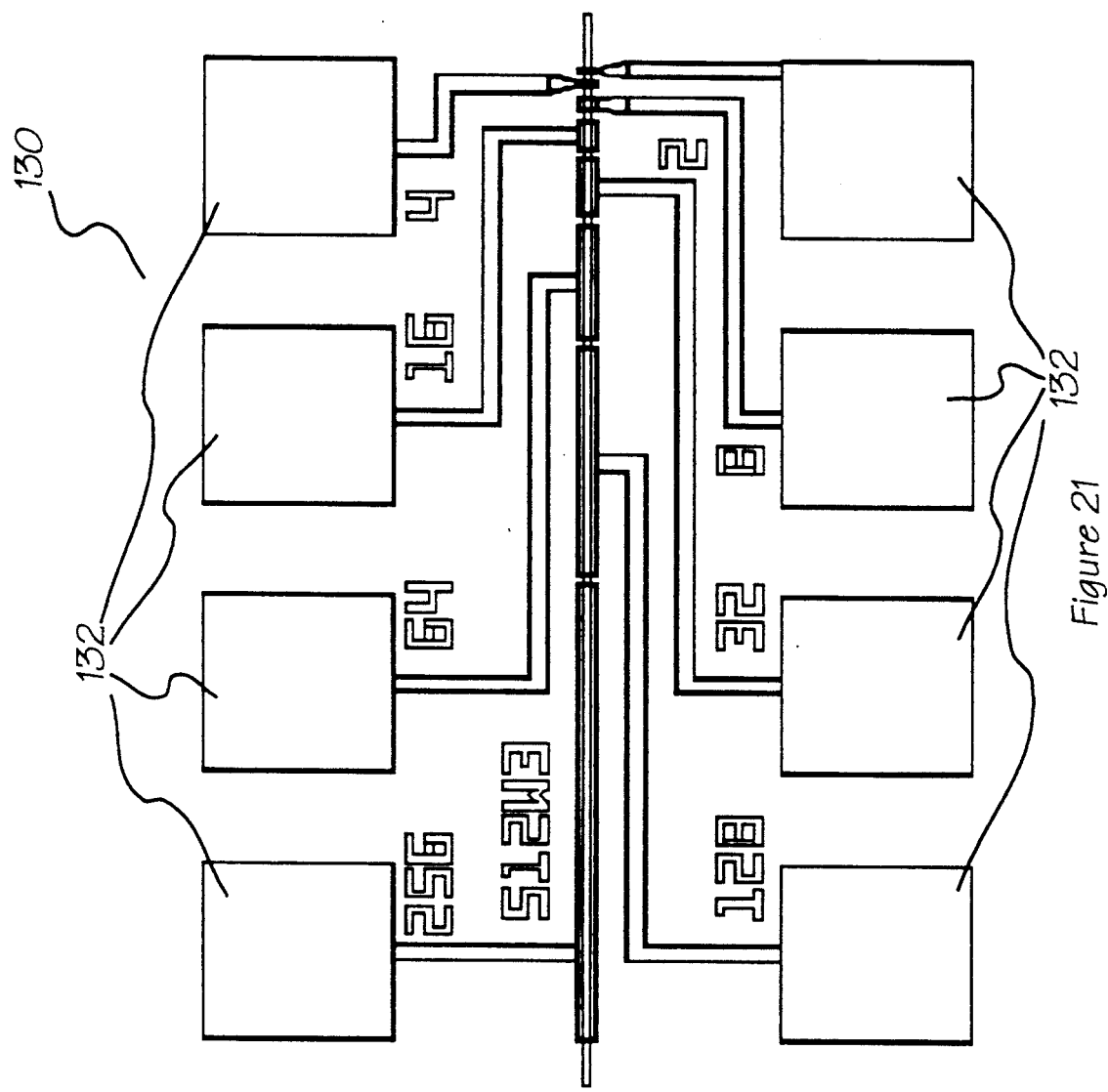
FIG. 21 is a plan view of the preferred digital phase modulator.

Therefore, since the 1 mm long device operates at 76.5°/V-mm one obtains ∼360° phase shift at 5 volts while a 500 μm long structure yields ∼180° phase shift at 5 volts and a 250 μm long device 90° at 5 volts. With this in mind, the 8-bit digital phase modulator 130 seen in FIG. 21 is preferred. This structure uses segmented pads 132 of 256, 128, 64, 32, 16, 8, 4, and 2 μm length placed in series over a single waveguide so that ∼5 volts applied to any combination of pads will directly result in a digitally-coded phase shift with 1.41° resolution. Tests of such a digital phase modulator 130 indicate the correct length-dependant phase shift at fixed bias values. Further detail concerning the digital phase modulator 130 are disclosed in a U.S. patent application filed Mar. 19, 1992, entitled *Digitally Controlled Distributed Phase Shifter* by the present inventors.

Figure 22:
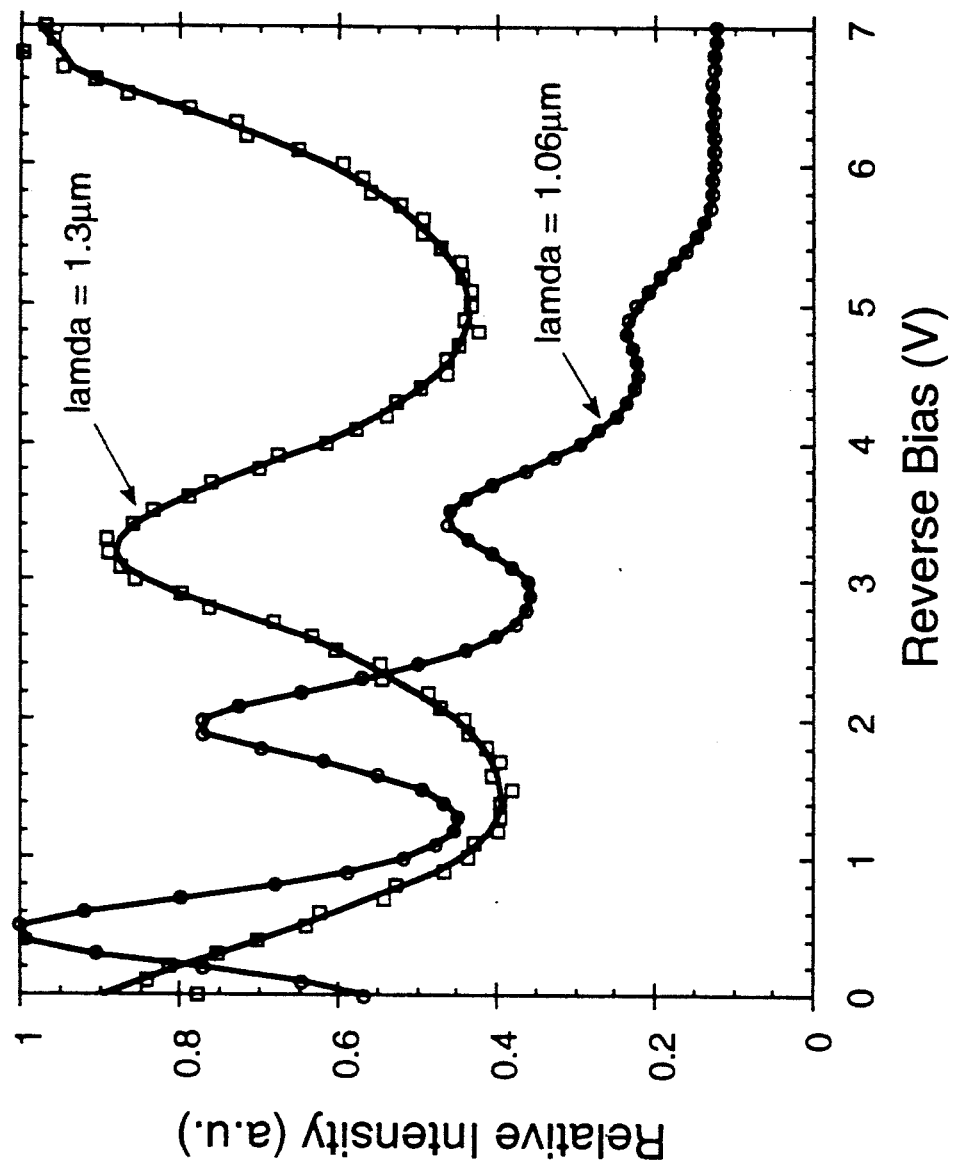
FIG. 22 is a graph of transmitted intensity versus reverse bias from the 1.0 mm long structure shown in FIG. 7 at both 1.06 μm and 1.32 μm wavelengths.

FIG. 22 shows transmitted intensity vs. applied reverse bias for a fully metalized 1 mm long modulator. The peak spacing corresponds to V$\pi$=1.52 V and 3.53 V at 1.06 and 1.32 μm, respectively. These V$\pi$ values translate to a FOM of 118 and 51°/V-mm, respectively, which is fairly constant over the range of bias tested.

The most remarkable aspect of the data presented in FIG. 22 is the dramatic change in transmitted intensity of 1.06 μm light through the waveguide as function of reverse bias applied to the p-n junction. Here one sees that at the maximum measured bias of 7 volts 85% of the light is absorbed through bias-dependent effects such as the Franz-Keldysh effect In contrast the 1.3 μm datum indicate that the waveguide actually becomes more transparent with increased reverse bias. This reduced loss is most likely due to reduced free-carrier absorption in the waveguide as the depletion width increases with reverse bias. In the 1.06 μm case, this free-carrier effect is also present but is overshadowed by the Franz-Keldysh effect. Calculations of the change in absorption coefficient of bulk GaAs at 1.06 μm, as function of applied electric field in the material, due to the Franz-Keldysh effect verify that the range of absorption change seen in these devices is consistent with electric field induced absorption. This comparison of bias dependent absorption clearly indicates that for coherent applications, where spurious amplitude modulation is undesirable, it is preferred to operate GaAs/AlGaAs waveguide phase modulators at 1.3 μm in spite of the approximate factor of two reduction in FOM.

EXAMPLE 2

Figure 23:
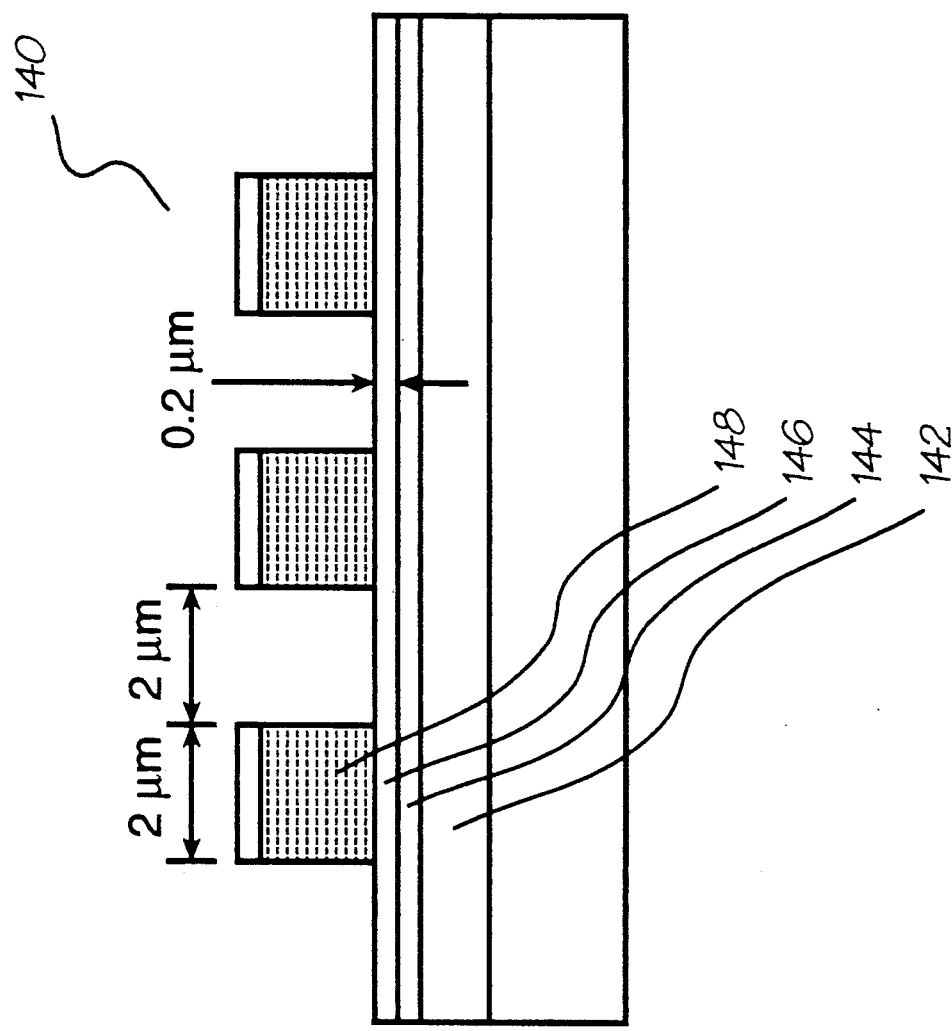
FIG. 23 is a cross-section view of the preferred three waveguide power splitter of the invention.

To demonstrate the fabrication process of the invention, ridge-waveguide directional couplers 140 were designed and fabricated according to FIG. 23. The three-waveguide power-splitter 140 was designed to operate at 1.06 μm wavelength with a theoretical coupling length of 650 μm according to beam propagation analysis. The epitaxial layers were grown by molecular beam epitaxy according to Table 1.

TABLE 1

| Layer Description | Material | Thickness | Number of Periods |
|---|---|---|---|
| Cap Layer | GaAs | 75 nm | 1 |
| Upper Waveguide Cladding with Periodic Multi-Layer 148 | Al$_{0.4}$Ga$_{0.6}$As/ AlAs | 45 nm/5 nm | 26 |
| Upper Waveguide Cladding 146 | Al$_{0.4}$Ga$_{0.6}$As | 200 nm | 1 |
| Waveguide Core 144 | GaAs | 250 nm | 1 |
| Lower Waveguide Cladding 142 | Al$_{0.4}$Ga$_{0.6}$As | 1500 nm | 1 |
| Substrate/Buffer | GaAs | — | — |

Figure 24:
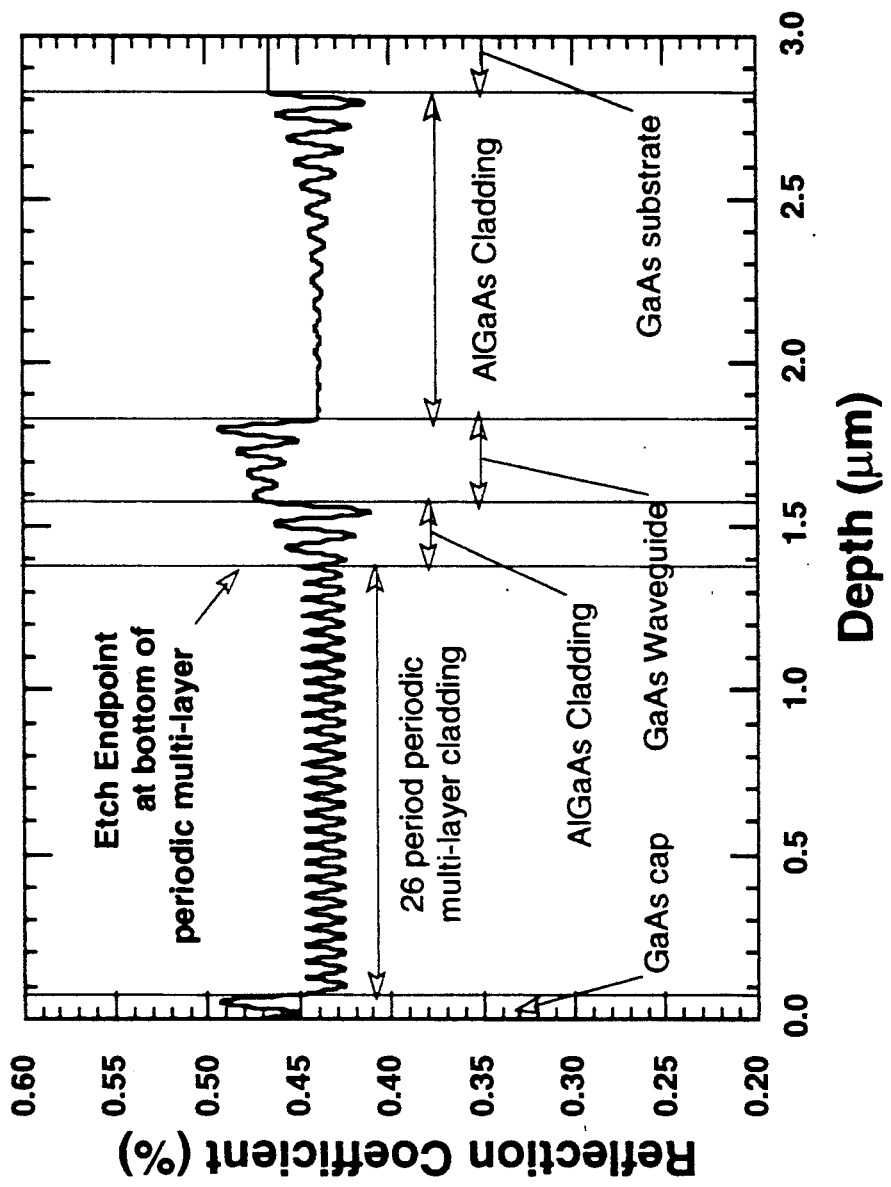
FIG. 24 is a graph showing reflection coefficient versus etch depth for 543.5 mm light at 40° from normal incidence.

In order to monitor and control the etch depth of the ridge waveguide, the entire thickness of the upper cladding layer intended to be removed outside the rib consisted of Al$_{0.4}$Ga$_{0.6}$As with 5 nm AlAs layers placed every 45 mm to create a periodic refractive index discontinuity. The effect of these periodic AlAs layers is to establish a sharply defined periodicity in the optical reflection magnitude versus etch depth as shown in FIG. 24. The periodic reflection versus depth relationship allows the nonselective etch to proceed at a measured rate with well-defined reflection peaks occurring every 50 mm in depth. Without these periodic layers the reflection versus etch depth resembles that shown for the lower cladding layer in FIG. 24, where the periodic reflection oscillations created by the single GaAs/Al$_{0.4}$Ga$_{0.6}$As interface and the sample surface are highly damped by absorption in the material. The flatness of the reflection versus etch depth near the top of the layer makes endpoint detection at a specified distance above the interface very difficult, since extremely small peaks are easily missed. Use of the periodic layers permits etching to any point within the layer stack with an error of only ±10 nm.

Coupling length of the as-etched devices was measured using comparison of near-field optical mode profiles from cleaved devices of various interaction lengths between 100 and 1000 μm. The final measured coupling length was 570 μm. This compares well with the 650 μm design value. The shift in coupling length is due largely to errors in linewidth caused by the optical contact print process used to expose the photoresist etch mask. However, even this 80 μm reduction in coupling length results in only a 0.2 dB penalty per guide in the power-splitter design. Thus, neglecting scattering and absorption, a three-guide power splitter with a 650 μm interaction length operates with a 0.4 dB insertion loss.

EXAMPLE 3

Figure 25:
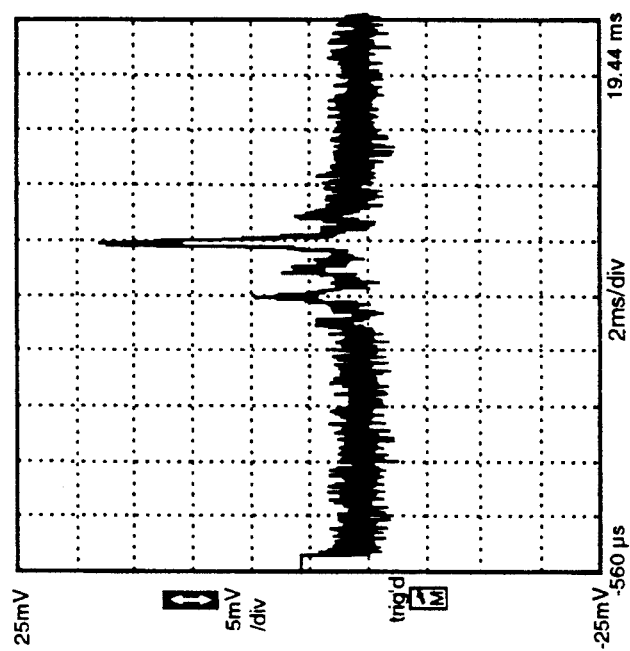
FIG. 25 is a graph showing experimental output spectrum from a Mach-Zehnder modulator operated to produce an optical frequency translation.

Experimentally, a standard Mach-Zehnder amplitude modulator was "over-driven" to a $\beta \approx 1.84$ and operated with phase offsets as for SSB operation. The resulting output spectrum is shown in FIG. 25. Note the similarity to the theoretical spectrum shown in FIG. 16c. The lower sideband was approximately 6 dB down from the upper, which is below the theoretical of 8 dB. The drive level was probably a bit above 1.84, as seen by the reduced carrier power. Stable operation was observed over extended periods of time (several hours). Unfortunately, due to the design of the Mach-Zehnder used for the experiment, operation close to device electrical breakdown was required to produce the spectrum shown in FIG. 25.

EXAMPLE 4

The photonic integrated circuit technology may also be used to fabricate a tunable filter for extraction of specific frequency information from an optical fiber carrying different information at many separate frequency bands. An example of this situation is the cable television industry, where it is desired to distribute optical fiber to individual homes and send television picture information using lightwaves in the fiber. Hundreds of different television channels could then be sent over an individual fiber with each channel using a different frequency or wavelength. A tunable optical filter would be used to extract information from a single desired channel and send only that channel to be imaged in the television set.

Figure 26:
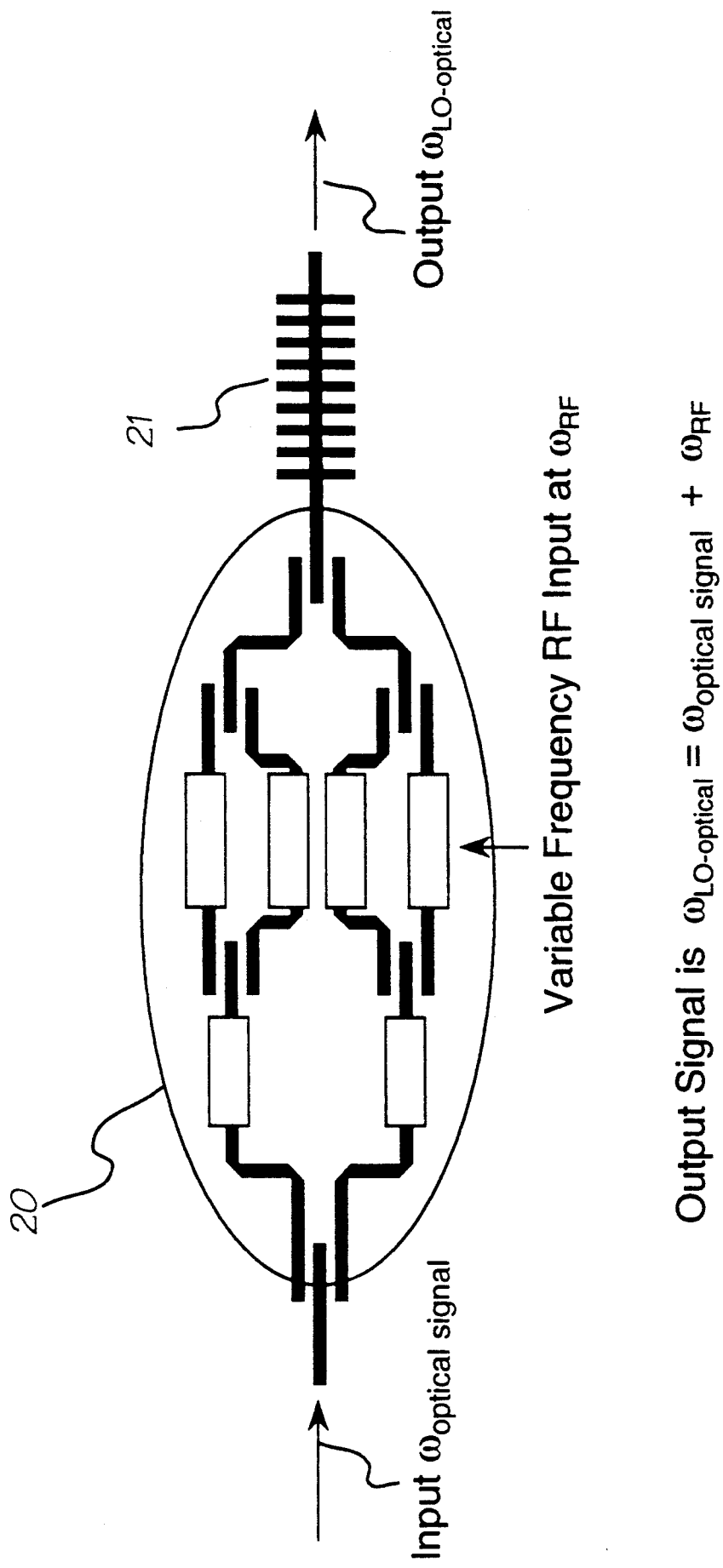
FIG. 26 is a schematic diagram of the preferred tunable filter of the invention.

Such a tunable filter is shown in FIG. 26, where the OFT circuit 20 (same as the OFT circuit described earlier) is integrated with a narrow band-pass grating filter 21. The filter transmits only light at frequency $\omega_{LO\text{-}optical}$. The OFT section is used to frequency translate all of the input light such that the desired optical channel will pass through the filter and all other optical channels are rejected.

EXAMPLE 5

The following specific commercial applications are contemplated for the phased-array antenna steering system of the present invention:

(a) Radar for commercial airlines.

Electronically steerable radar systems would offer several advantages over conventional mechanically steered radar systems in avionic applications. For ground based radar, the radar's direction can be changed virtually instantaneously due to a lack of mechanical inertia. This would allow for a much more rapid updating of radar position information which should allow for better collision avoidance in congested air traffic areas. Additionally, an electronically steered antenna would never suffer from mechanical wear, having no moving parts. Aboard aircraft phased-array antennas would offer the benefits discussed above, plus the additional promises of consuming less space (they can be conformal to the aircraft's body) and being lighter than conventional mechanical based systems.

(b) Automotive applications

Radars—It is probable that future automobiles will incorporate radar systems for collision avoidance. Clearly, if a phased-array antenna could be made economically practical, it would be the ideal choice for such an application.

Communications—If a microwave communication system were to be employed in a moving vehicle, clearly a very directional, agile antenna would be required. A phased-array antenna again would be the ideal antenna. This application requires a phased-array antenna mounted on the automobile's roof top.

(c) General sensing applications

Any sensing application requiring directional range finding or microwave "vision" would benefit from an inexpensive phased-array antenna. For example, in robotics, microwave vision would not only provide absolute range information, but would also be able to see through smoke and haze.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A coherent optical monolithic phased-array antenna steering system apparatus comprising:
   means for generating a reference lightwave signal;
   photonic integrated circuit means for generating a primary frequency-shifted lightwave signal from said reference lightwave signal;
   photonic integrated circuit means for dividing and phase-shifting under voltage control said reference lightwave signal and dividing said frequency-shifted lightwave signal to form a plurality of pairs of lightwave signals, each of said pairs comprising a collateral frequency-shifted lightwave signal and a phase-shifted lightwave signal;
   means for heterodyning each pair of said plurality of pairs of lightwave signals and thereby generating a plurality of RF signals; and
   means for transmitting said plurality of RF signals.

2. The apparatus of claim 1 wherein said means for generating a reference lightwave signal comprises a continuous-wave laser.

3. The apparatus of claim 1 further comprising at least one microwave power splitter for providing microwave power to said means for generating a primary frequency-shifted lightwave signal.

4. The apparatus of claim 1 wherein said means for generating a primary frequency-shifted lightwave signal comprises at least one pair of phase modulators.

5. The apparatus of claim 4 wherein said means for generating a primary frequency-shifted lightwave signal comprises at least two pairs of phase modulators connected in push-pull configuration.

6. The apparatus of claim 1 wherein said means for dividing and phase-shifting under voltage control said reference lightwave signal and dividing said primary frequency-shifted lightwave signal to form a plurality of pairs of lightwave signals comprises a plurality of signal dividers.

7. The apparatus of claim 1 wherein said means for dividing and phase-shifting under voltage control said reference lightwave signal and dividing said primary frequency-shifted lightwave signal to form a plurality of pairs of lightwave signals comprises a plurality of optical phase-shifting means.

8. The apparatus of claim 7 wherein the phase shift provided by said plurality of optical phase-shifting means is controlled by segmented pads of lengths varying by powers of 2 from a length of a shortest pad, each pad being capable of having a voltage applied to it.

9. The apparatus of claim 1 wherein said means for heterodyning each pair of said plurality of pairs of lightwave signals and generating a plurality of RF signals and said means for transmitting said plurality of RF signals comprise a plurality of transmit/receive modules.

10. The apparatus of claim 9 wherein each of said plurality of transmit/receive modules comprises photodetector means, amplifier means, transmit means, and receive means.

11. A method of steering a phased-array antenna, the method comprising the steps of:
producing a reference lightwave signal;
generating by photonic integrated circuit means a primary frequency-shifted lightwave signal from the reference lightwave signal;
dividing and phase-shifting under voltage control the reference lightwave signal and dividing the primary frequency-shifted lightwave signal by photonic integrated circuit means to form a plurality of pairs of lightwave signals, each of said pairs comprising a collateral frequency-shifted lightwave signal and a phase-shifted lightwave signal;
heterodyning each pair of the plurality of pairs of lightwave signals, thereby generating a plurality of RF signals; and
transmitting the plurality of RF signals.

12. The method of claim 11 wherein the step of producing a reference lightwave signal comprises the step of providing at least one continuous-wave laser.

13. The method of claim 11 wherein the step of generating a primary frequency-shifted lightwave signal comprises the step of providing at least one pair of phase modulators.

14. The method of claim 13 wherein the step of providing at least one pair of phase modulators comprises the step of providing at least two pairs of phase modulators connected in push-pull configuration.

15. The method of claim 11 wherein the step of dividing and phase-shifting under voltage control the reference lightwave signal and dividing the primary frequency-shifted lightwave signal by photonic integrated circuit means to form a plurality of pairs of lightwave signals comprises the step of providing a plurality of dividers.

16. The method of claim 11 wherein the step of dividing and phase-shifting under voltage control the reference lightwave signal and dividing the primary frequency-shifted lightwave signal by photonic integrated circuit means to form a plurality of pairs of lightwave signals comprises the step of providing a plurality of optical phase shifters.

17. The method of claim 16 wherein the step of providing a plurality of optical phase shifters further comprises the step of controlling the phase shifters by segmented pads of lengths varying by powers of 2 from a length of a shortest pad, each pad being capable of having a voltage applied to it.

18. The method of claim 11 wherein the steps of heterodyning each pair of the plurality of pairs of lightwave signals, thereby generating a plurality of RF signals, and transmitting the plurality of RF signals comprise the step of providing a plurality of transmit/receive modules.

19. The method of claim 18 wherein the step of providing a plurality of transmit/receive modules comprises the step of providing photodetector means, amplifier means, transmit means and receive means for each of the transmit/receive modules.

20. A photonic integrated circuit apparatus comprising:
photonic integrated circuit means comprising a single optical frequency translator for generating a primary frequency-shifted lightwave from a reference lightwave; and
photonic integrated circuit means comprising a voltage-controlled optical phase controller for generating a plurality of pairs of lightwave from said primary frequency-shifted lightwave and said reference lightwave, each of said pairs comprising a collateral frequency-shifted lightwave and a phase-shifted lightwave.

21. The apparatus of claim 20 further comprising continuous-wave laser input means for providing said reference lightwave.

22. The apparatus of claim 20 further comprising microwave frequency reference input means for providing a corresponding frequency shift to said primary frequency-shifted lightwave.

23. The apparatus of claim 20 wherein said means comprising an optical frequency translator comprises a plurality of optical phase shifter means.

24. The apparatus of claim 20 wherein said means comprising an optical frequency translator comprises a plurality of Mach-Zehnder interferometers.

25. The apparatus of claim 24 wherein said plurality of Mach-Zehnder interferometers comprise a plurality of phase modulators.

26. The apparatus of claim 25 wherein said plurality of Mach-Zehnder interferometers comprise at least two pairs of phase modulators connected in push-pull configuration.

27. The apparatus of claim 20 wherein said means comprising a voltage-controlled optical phase controller comprises phase-shift control means.

28. The apparatus of claim 27 wherein said voltage-controlled phase-shift control means comprises analog phase control means.

29. The apparatus of claim 27 wherein said voltage-controlled phase-shift control means comprises segmented pads, of lengths varying by powers of 2 from a length of a shortest pad, placed in series adjacent a photonic integrated circuit waveguide carrying a divided reference lightwave, each segmented pad being capable of having a voltage applied to it.

30. A method of using a photonic integrated circuit, the method comprising the steps of:
generating by photonic integrated circuit means a primary frequency-shifted lightwave from a reference lighwave; and
generating by photonic integrated circuit means comprising voltage-control means a plurality of pairs of lightwaves from the primary frequency-shifted and reference lightwaves, each of the pairs comprising a collateral frequency-shifted lightwave and a phase-shifted lightwave.

31. The method of claim 30 further comprising the step of providing a continuous-wave laser input for providing the reference lightwave.

32. The method of claim 30 further comprising the step of providing a microwave frequency reference input for providing a corresponding frequency shift to the primary frequency-shifted lightwave.

33. The method of claim 30 wherein the step of generating a primary frequency-shifted lightwave comprises the step of providing a plurality of Mach-Zehnder interferometers.

34. The method of claim 33 wherein the step of providing a plurality of Mach-Zehnder interferometers comprises the step of providing a plurality of phase modulators.

35. The method of claim 34 wherein the step of providing a plurality of Mach-Zehnder interferometers comprises the step of providing at least two phase modulators connected in push-pull configuration.

36. The method of claim 30 wherein the step of generating a plurality of pairs of lightwaves comprises the step of providing a phase-shift control 37. The method of claim 36 wherein the step of providing a phase-shift control comprises the step of controlling phase shift by analog voltages.

38. The method of claim 36 wherein the step of providing a phase-shift control comprises the step of controlling phase shift by digital voltages.

39. The method of claim 36 wherein the step of providing a phase-shift control comprises the step of controlling phase shift by means of segmented pads, of lengths varying by powers of 2 from a length of a shortest pad, placed in series adjacent a photonic integrated circuit waveguide carrying a divided reference lightwave, each segmented pad being capable of having a voltage applied to it.

* * * * *